US012724576B2

(12) United States Patent
Hamada

(10) Patent No.: US 12,724,576 B2
(45) Date of Patent: Sep. 1, 2026

(54) INFORMATION PROCESSING APPARATUS CAPABLE OF IMPLEMENTING MIXED-SHEET PRINTING IN WHICH PREDETERMINED PRINT SETTING IS DIFFERENT AMONG PAGES, CONTROL METHOD FOR INFORMATION PROCESSING APPARATUS, AND STORAGE MEDIUM

(71) Applicant: CANON KABUSHIKI KAISHA, Tokyo (JP)

(72) Inventor: Yoshinobu Hamada, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 212 days.

(21) Appl. No.: 18/421,357

(22) Filed: Jan. 24, 2024

(65) Prior Publication Data

US 2024/0256199 A1 Aug. 1, 2024

(30) Foreign Application Priority Data

Jan. 26, 2023 (JP) ................................ 2023-010273

(51) Int. Cl.
*G06F 3/12* (2006.01)

(52) U.S. Cl.
CPC .......... *G06F 3/1241* (2013.01); *G06F 3/1205* (2013.01); *G06F 3/1255* (2013.01); *G06F 3/1285* (2013.01)

(58) Field of Classification Search
CPC .... G06F 3/1241; G06F 3/1205; G06F 3/1255; G06F 3/1285
See application file for complete search history.

(56) References Cited

U.S. PATENT DOCUMENTS 6,707,563 B1 * 3/2004 Barry .................... G06F 3/1285 358/1.14
2004/0190042 A1 * 9/2004 Ferlitsch ............... H04L 69/329 710/16
2005/0007614 A1 * 1/2005 Kishigami ......... H04N 1/32502 358/1.15

(Continued)

FOREIGN PATENT DOCUMENTS

JP 2021124791 A 8/2021

*Primary Examiner* — Nicholas Pachol
(74) *Attorney, Agent, or Firm* — ROSSI, KIMMS & McDOWELL LLP

(57) ABSTRACT

An information processing apparatus that causes a printing apparatus to execute mixed-sheet printing in which a predetermined print setting is different among pages. Intermediate data including the predetermined print setting of each of a plurality of pages is obtained. It is determined whether or not the printing apparatus has a capability of the mixed-sheet printing. Print data for causing the printing apparatus to execute the mixed-sheet printing is generated based on the intermediate data and transmitted to the printing apparatus. When the printing apparatus does not have the capability of the mixed-sheet printing, the predetermined print settings included in the intermediate data are obtained in order of the pages to be printed, and a plurality of pieces of print data is generated based on a plurality of pieces of divided intermediate data obtained by dividing the intermediate data based on differences among the predetermined print settings of the plurality of pages.

12 Claims, 36 Drawing Sheets

(56) References Cited

U.S. PATENT DOCUMENTS

| | | | | | |
|---|---|---|---|---|---|
| 2006/0033956 | A1* | 2/2006 | Takahashi | H04N 1/32545 | 358/1.15 |
| 2007/0229860 | A1* | 10/2007 | Matsubara | G06F 3/1288 | 358/1.9 |
| 2007/0285724 | A1* | 12/2007 | Saito | G06F 3/125 | 358/1.18 |
| 2008/0079963 | A1* | 4/2008 | Matsubara | G06F 3/1241 | 358/1.9 |
| 2008/0309962 | A1* | 12/2008 | Smith | G06F 3/1219 | 358/1.15 |
| 2012/0002219 | A1* | 1/2012 | Komine | H04N 1/46 | 358/1.9 |
| 2016/0103644 | A1* | 4/2016 | Saito | H04N 1/00411 | 358/1.15 |
| 2021/0240412 | A1 | 8/2021 | Saigusa | | |

* cited by examiner

FIG. 4

| ITEM NAME | ATTRIBUTE VALUE |
|---|---|
| SHEET SIZE | A6/A5/A4/B5/LETTER/LEGAL/EXECUTIVE/POSTCARD/#10 ENVELOPE VERTICAL /DL ENVELOPE VERTICAL /ENVELOPE (JAPANESE WESTERN-STYLE ENVELOPE NO. 4) VERTICAL /ENVELOPE (LONG TYPE NO. 3) VERTICAL/ENVELOPE (LONG TYPE NO. 4) VERTICAL /ENVELOPE C5 VERTICAL/ENVELOPE MONARCH VERTICAL /L/4X6(KG SIZE)/5X7/6P (8X10)/SQUARE (127mm)/BUSINESS CARD (CARD) /ENVELOPE (LONG TYPE NO. 6) VERTICAL/SQUARE (89mm)/SQUARE (4X4) |
| SHEET TYPE | ENVELOPE/LABEL/PLAIN PAPER/PHOTO PAPER/PHOTO PAPER LUSTER STANDARD /PHOTO PAPER SILKY TONE/POSTCARD FOR INKJET PRINTER (COMMUNICATION SURFACE) /POSTCARD FOR INKJET PRINTER (ADDRESS SURFACE) /POSTCARD FOR INKJET PHOTO (COMMUNICATION SURFACE) /POSTCARD FOR INKJET PHOTO (ADDRESS SURFACE) |
| NUMBER OF COPIES | Max=99 |
| SHEET ORIENTATION | PORTRAIT/LANDSCAPE |
| PRINT QUALITY | STANDARD/DRAFT |
| PRINT BASED ON NUMBER OF COPIES | ON/OFF |
| STAPLER | NO/AUTOMATIC/UPPER LEFT/LOWER LEFT/UPPER RIGHT/LOWER RIGHT /LEFT END (TWO-POINT BINDING)/UPPER END (TWO-POINT BINDING) /RIGHT END (TWO-POINT BINDING)/LOWER END (TWO-POINT BINDING) /SADDLE STITCHING/STAPLELESS BINDING |
| PUNCH | NO/PUNCH HOLE (AUTOMATIC)/PUNCH HOLE (TWO HOLES ON LEFT SIDE) /PUNCH HOLE (THREE HOLES ON LEFT SIDE)/PUNCH HOLE (FOUR HOLES ON LEFT SIDE) /PUNCH HOLE (MULTI-HOLE ON LEFT SIDE)/PUNCH HOLE (TWO HOLES ON RIGHT SIDE) /PUNCH HOLE (THREE HOLES ON RIGHT SIDE)/PUNCH HOLE (FOUR HOLES ON RIGHT SIDE) /PUNCH HOLE (MULTI-HOLE ON RIGHT SIDE)/PUNCH HOLE (TWO HOLES ON UPPER SIDE) /PUNCH HOLE (THREE HOLES ON UPPER SIDE)/PUNCH HOLE (FOUR HOLES ON UPPER SIDE) /PUNCH HOLE (MULTI-HOLE ON UPPER SIDE)/PUNCH HOLE (TWO HOLES ON LOWER SIDE) /PUNCH HOLE (THREE HOLES ON LOWER SIDE)/PUNCH HOLE (FOUR HOLES ON LOWER SIDE) /PUNCH HOLE (MULTI-HOLE ON LOWER SIDE) |
| FOLDING SETTING | NO/FOLDED IN HALF/C-FOLDING/FOLDED IN FOUR/FOLDED IN THREE OUTSIDE/Z-FOLDING /SADDLE FOLDING (OUTPUT FROM SADDLE FINISHER) |
| COLOR MODE | COLOR/MONOCHROME |
| PAGE AGGREGATION | OFF/2in1/4in1/6in1/9in1/16in1 |
| PLACEMENT ORDER | FROM LEFT TO RIGHT/FROM RIGHT TO LEFT |
| MAGNIFICATION | NO/FIT TO PAGE WIDTH/FIT TO SCREEN SIZE |
| DOUBLE-SIDED PRINTING | ONE-SIDED/DOUBLE-SIDED |
| BINDING DIRECTION | LONG EDGE BINDING/SHORT EDGE BINDING |
| ROTATION OF 180 DEGREES | NO/LEFT ROTATION/RIGHT ROTATION |
| MIXED-SHEET PRINTING | ON/OFF |
| SAVE JOB IN PRINTER | ON/OFF |
| JOB NAME ABBREVIATION | ON/OFF |
| LANGUAGE SWITCHING | Japanese/English/French/German/Italian/Spanish/Portuguese/ Dutch/Danish/Norwegian/Swedish/Finnish/Polish/Czech/ Russian/Turkish/Chinese(Simplified)/Chinese(Traditional)/Korean/ Thai/Indonesian |

FIG. 6A

```xml
<?xml version="1.0" encoding="utf-8"?>
<PrintDeviceCapabilities
 xmlns:xsi="http://www.w3.org/2001/XMLSchema-instance"
 xmlns:xsd="http://www.w3.org/2001/XMLSchema"
 xmlns:xml="http://www.w3.org/XML/1998/namespace"
 xmlns:psk="http://schemas.microsoft.com/windows/2003/08/printing/printschemakeywords"
 xmlns:psk12="http://schemas.microsoft.com/windows/2013/12/printing/printschemakeywordsv12"
 xmlns:psf="http://schemas.microsoft.com/windows/2003/08/printing/printschemaframework"
 xmlns:psf2="http://schemas.microsoft.com/windows/2013/12/printing/printschemaframework2"
 xmlns="http://schemas.microsoft.com/windows/2013/12/printing/printschemaframework2"
 version="2">

  <psk:JobCopiesAllDocuments psf2:psftype="ParameterDef">
    <psf:DataType xsi:type="xsd:QName" psf2:psftype="Property">xsd:integer</psf:DataType>
    <psf:DefaultValue xsi:type="xsd:integer" psf2:psftype="Property">1</psf:DefaultValue>
    <psf:Mandatory xsi:type="xsd:QName" psf2:psftype="Property">psk:Unconditional</psf:Mandatory>
    <psf:MaxValue xsi:type="xsd:integer" psf2:psftype="Property">999</psf:MaxValue>
    <psf:MinValue xsi:type="xsd:integer" psf2:psftype="Property">1</psf:MinValue>
    <psf:Multiple xsi:type="xsd:integer" psf2:psftype="Property">1</psf:Multiple>
    <psf:UnitType xsi:type="xsd:string" psf2:psftype="Property">copies</psf:UnitType>
  </psk:JobCopiesAllDocuments>
```

```
<psk:PageMediaSize psf2:psftype="Feature">
  <psk:ISOA4 psf2:psftype="Option">
    <psk12:PortraitImageableSize xsi:type="psf2:ImageableAreaType" psf2:psftype="Property">12700,12700,184600,271600</psk12:PortraitImageableSize>
    <psk:MediaSizeHeight xsi:type="xsd:integer" psf2:psftype="ScoredProperty">297000</psk:MediaSizeHeight>
    <psk:MediaSizeWidth xsi:type="xsd:integer" psf2:psftype="ScoredProperty">210000</psk:MediaSizeWidth>
  </psk:ISOA4>
  <psk:NorthAmericaLetter psf2:psftype="Option" psf2:default="true">
    <psk12:PortraitImageableSize xsi:type="psf2:ImageableAreaType" psf2:psftype="Property">12700,12700,190500,254000</psk12:PortraitImageableSize>
    <psk:MediaSizeHeight xsi:type="xsd:integer" psf2:psftype="ScoredProperty">279400</psk:MediaSizeHeight>
    <psk:MediaSizeWidth xsi:type="xsd:integer" psf2:psftype="ScoredProperty">215900</psk:MediaSizeWidth>
  </psk:NorthAmericaLetter>
</psk:PageMediaSize>

<psk:PageOrientation psf2:psftype="Feature">
  <psk:Landscape psf2:psftype="Option"/>
  <psk:Portrait psf2:psftype="Option" psf2:default="true"/>
</psk:PageOrientation>

 .............
```

```
  <psk:PageOutputColor psf2:psftype="Feature">
    <psk:Color psf2:psftype="Option" psf2:default="true">
      <psk:DeviceBitsPerPixel xsi:type="xsd:integer" psf2:psftype="ScoredProperty">24</psk:DeviceBitsPerPixel>
      <psk:DriverBitsPerPixel xsi:type="xsd:integer" psf2:psftype="ScoredProperty">24</psk:DriverBitsPerPixel>
    </psk:Color>
  </psk:PageOutputColor>
</PrintDeviceCapabilities>
```

FIG. 6D

```xml
<?xml version="1.0" encoding="UTF-8"?>
<PrintDeviceCapabilities
  xmlns:ns0000="http://schemas.microsoft.com/windows/2018/04/printing/printschemakeywords/Ipp"
  xmlns:xsi="http://www.w3.org/2001/XMLSchema-instance"
  xmlns:xsd="http://www.w3.org/2001/XMLSchema"
  xmlns:xml="http://www.w3.org/XML/1998/namespace"
  xmlns:psk="http://schemas.microsoft.com/windows/2003/08/printing/printschemakeywords"
  xmlns:psk11="http://schemas.microsoft.com/windows/2013/05/printing/printschemakeywordsv11"
  xmlns:psk12="http://schemas.microsoft.com/windows/2013/12/printing/printschemakeywordsv12"
  xmlns:psf="http://schemas.microsoft.com/windows/2003/08/printing/printschemaframework"
  xmlns:psf2="http://schemas.microsoft.com/windows/2013/12/printing/printschemaframework2"
  xmlns="http://schemas.microsoft.com/windows/2013/12/printing/printschemaframework2"
  version="2">

  <!-- copies-default, copies-supported -->
  <psk:JobCopiesAllDocuments psf2:psftype="ParameterDef">
    <psf:DataType psf2:psftype="Property" xsi:type="xsd:QName">xsd:integer</psf:DataType>
    psf:DefaultValue psf2:psftype="Property" xsi:type="xsd:integer">1</psf:DefaultValue>
    <psf:Mandatory psf2:psftype="Property" xsi:type="xsd:QName">psk:Unconditional</psf:Mandatory>
    <psf:MinValue psf2:psftype="Property" xsi:type="xsd:integer">1</psf:MinValue>
    <psf:MaxValue psf2:psftype="Property" xsi:type="xsd:integer">99</psf:MaxValue>
    <psf:Multiple psf2:psftype="Property" xsi:type="xsd:integer">1</psf:Multiple>
    <psf:UnitType psf2:psftype="Property" xsi:type="xsd:string">copies</psf:UnitType>
  </psk:JobCopiesAllDocuments>
```

```
<!-- media-default, media-supported, media-col-database -->
  <psk:PageMediaSize psf2:psftype="Feature">
    <psk:JapanHagakiPostcard psf2:psftype="Option" psf2:default="false">
      <psk:MediaSizeWidth xsi:type="xsd:integer" psf2:psftype="ScoredProperty">100000</psk:MediaSizeWidth>
      <psk:MediaSizeHeight xsi:type="xsd:integer" psf2:psftype="ScoredProperty">148000</psk:MediaSizeHeight>
      <psk12:PortraitImageableSize xsi:type="psf2:ImageableAreaType" psf2:psftype="Property">3400,5000,93200,138000</psk12:PortraitImageableSize>
      <psk12:BorderlessImageableSize xsi:type="psf2:ImageableAreaType" psf2:psftype="Property">0,0,100000,148000</psk12:BorderlessImageableSize>
    </psk:JapanHagakiPostcard>
    <psk:ISOA5 psf2:psftype="Option" psf2:default="false">
      <psk:MediaSizeWidth xsi:type="xsd:integer" psf2:psftype="ScoredProperty">148000</psk:MediaSizeWidth>
      <psk:MediaSizeHeight xsi:type="xsd:integer" psf2:psftype="ScoredProperty">210000</psk:MediaSizeHeight>
      <psk12:PortraitImageableSize xsi:type="psf2:ImageableAreaType" psf2:psftype="Property">3400,5000,141200,200000</psk12:PortraitImageableSize>
      <psk12:BorderlessImageableSize xsi:type="psf2:ImageableAreaType" psf2:psftype="Property">0,0,148000,210000</psk12:BorderlessImageableSize>
    </psk:ISOA5>
    <psk:ISOA4 psf2:psftype="Option" psf2:default="false">
      <psk:MediaSizeWidth xsi:type="xsd:integer" psf2:psftype="ScoredProperty">210000</psk:MediaSizeWidth>
      <psk:MediaSizeHeight xsi:type="xsd:integer" psf2:psftype="ScoredProperty">297000</psk:MediaSizeHeight>
      <psk12:PortraitImageableSize xsi:type="psf2:ImageableAreaType" psf2:psftype="Property">3400,5000,203200,287000</psk12:PortraitImageableSize>
      <psk12:BorderlessImageableSize xsi:type="psf2:ImageableAreaType" psf2:psftype="Property">0,0,210000,297000</psk12:BorderlessImageableSize>
    </psk:ISOA4>
    <psk:NorthAmericaLetter psf2:psftype="Option" psf2:default="true">
      <psk:MediaSizeWidth xsi:type="xsd:integer" psf2:psftype="ScoredProperty">215900</psk:MediaSizeWidth>
      <psk:MediaSizeHeight xsi:type="xsd:integer" psf2:psftype="ScoredProperty">279400</psk:MediaSizeHeight>
      <psk12:PortraitImageableSize xsi:type="psf2:ImageableAreaType" psf2:psftype="Property">6400,5000,203200,269400</psk12:PortraitImageableSize>
      <psk12:BorderlessImageableSize xsi:type="psf2:ImageableAreaType" psf2:psftype="Property">0,0,215900,279400</psk12:BorderlessImageableSize>
    </psk:NorthAmericaLetter>
    <psk:JapanYou4Envelope psf2:psftype="Option" psf2:default="false">
      <psk:MediaSizeWidth xsi:type="xsd:integer" psf2:psftype="ScoredProperty">105000</psk:MediaSizeWidth>
      <psk:MediaSizeHeight xsi:type="xsd:integer" psf2:psftype="ScoredProperty">235000</psk:MediaSizeHeight>
      <psk12:PortraitImageableSize xsi:type="psf2:ImageableAreaType" psf2:psftype="Property">5600,8000,93800,214300</psk12:PortraitImageableSize>
      <psk12:BorderlessImageableSize xsi:type="psf2:ImageableAreaType" psf2:psftype="Property">0,0,105000,235000</psk12:BorderlessImageableSize>
    </psk:JapanYou4Envelope>
    <psk:NorthAmericaLegal psf2:psftype="Option" psf2:default="false">
      <psk:MediaSizeWidth xsi:type="xsd:integer" psf2:psftype="ScoredProperty">215900</psk:MediaSizeWidth>
      <psk:MediaSizeHeight xsi:type="xsd:integer" psf2:psftype="ScoredProperty">355600</psk:MediaSizeHeight>
      <psk12:PortraitImageableSize xsi:type="psf2:ImageableAreaType" psf2:psftype="Property">6400,5000,203200,345600</psk12:PortraitImageableSize>
      <psk12:BorderlessImageableSize xsi:type="psf2:ImageableAreaType" psf2:psftype="Property">0,0,215900,355600</psk12:BorderlessImageableSize>
    </psk:NorthAmericaLegal>
    <psk:JISB5 psf2:psftype="Option" psf2:default="false">
      <psk:MediaSizeWidth xsi:type="xsd:integer" psf2:psftype="ScoredProperty">182000</psk:MediaSizeWidth>
      <psk:MediaSizeHeight xsi:type="xsd:integer" psf2:psftype="ScoredProperty">257000</psk:MediaSizeHeight>
      <psk12:PortraitImageableSize xsi:type="psf2:ImageableAreaType" psf2:psftype="Property">3400,5000,175200,247000</psk12:PortraitImageableSize>
      <psk12:BorderlessImageableSize xsi:type="psf2:ImageableAreaType" psf2:psftype="Property">0,0,182000,257000</psk12:BorderlessImageableSize>
    </psk:JISB5>
  </psk:PageMediaSize>

  <!-- orientation-requested-default -->
  <psk:PageOrientation psf2:psftype="Feature">
    <psk:Portrait psf2:psftype="Option" psf2:default="true"/>
    <psk:Landscape psf2:psftype="Option" psf2:default="false"/>
    <psk:ReverseLandscape psf2:psftype="Option" psf2:default="false"/>
  </psk:PageOrientation>
```

```
''''''''''''''''''''''''

<!-- finishings-default, finishings-supported -->
<psk:JobStapleAllDocuments psf2:psftype="Feature">
  <psk:None psf2:psftype="Option" psf2:default="true"/>
  <psk:StapleTopLeft psf2:psftype="Option" psf2:default="false"/>
  <psk:StapleTopRight psf2:psftype="Option" psf2:default="false"/>
  <psk:StapleBottomLeft psf2:psftype="Option" psf2:default="false"/>
  <psk:StapleBottomRight psf2:psftype="Option" psf2:default="false"/>
  <psk:StapleDualLeft psf2:psftype="Option" psf2:default="false"/>
  <psk:StapleDualTop psf2:psftype="Option" psf2:default="false"/>
  <psk:StapleDualRight psf2:psftype="Option" psf2:default="false"/>
  <psk:StapleDualBottom psf2:psftype="Option" psf2:default="false"/>
  <psk:SaddleStitch psf2:psftype="Option" psf2:default="false"/>
</psk:JobStapleAllDocuments>

<!-- sides-default, sides-supported -->
<psk:JobDuplexAllDocumentsContiguously psf2:psftype="Feature">
  <psk:OneSided psf2:psftype="Option" psf2:default="true"/>
  <psk:TwoSidedShortEdge psf2:psftype="Option" psf2:default="false"/>
  <psk:TwoSidedLongEdge psf2:psftype="Option" psf2:default="false"/>
</psk:JobDuplexAllDocumentsContiguously>

<!-- print-color-mode-default, print-color-mode-supported, pwg-raster-document-type-supported -->
<psk:PageOutputColor psf2:psftype="Feature">
  <psk:Color psf2:psftype="Option" psf2:default="true"/>
  <psk:Grayscale psf2:psftype="Option" psf2:default="false"/>
  <psk:Monochrome psf2:psftype="Option" psf2:default="false"/>
</psk:PageOutputColor>

603
<ns0000:MixedPageMediaPrinting psf2:psftype="Feature">
  <ns0000:Off psf2:psftype="Option" psf2:default="true"/>
  <ns0000:On psf2:psftype="Option" psf2:default="false"/>
</ns0000:MixedPageMediaPrinting>

</PrintDeviceCapabilities>
```

```
[Version]
Signature = "$WIN NT$"
Class = Extension
ClassGuid = {e2f84ce7-8efa-411c-aa69-97454ca4cb57}
Provider = %ManufacturerName%
ExtensionId = {D4D9196A-105B-4B76-B693-84BD33A7A703}
CatalogFile = App.cat
DriverVer = 08/19/2020,16.35.13.542

[Manufacturer]
%ManufacturerName% = Ms, NTamd64.6.3

[Microsoft.NTamd64.6.3]
%Device.ExtensionDesc% = App-Install, %PrinterHardwareId%
%Device.ExtensionDesc% = App-Install, %PrinterHardwareId2%
%Device.ExtensionDesc% = App-Install, %PrinterHardwareId3%

[App-Install.NT]
AddProperty = Add-App-Property

[App-Install.NT.Software]
AddSoftware = %SoftwareName%,, Ms-App-SoftwareInstall

[Microsoft-App-SoftwareInstall]
SoftwareType = %MsStoreType%
SoftwareID = pfn://%PackageFamilyName%

[Add-App-Property]
{A925764B-88E0-426D-AFC5-B39768BE59EB}, 1, 0x12,, %AUMID%

[Strings]
ManufacturerName = "Ms"
SoftwareName = "CPrintApp"
PackageFamilyName = "PrinterApp_aaaaaaaaaaa8a"
AUMID = "PrinterApp_aaaaaaaaaaa8a!App"
Device.ExtensionDesc = "PrintApp"
MsStoreType = 2
PrinterHardwareId = "PrinterApp_device001"
```

INFORMATION PROCESSING APPARATUS CAPABLE OF IMPLEMENTING MIXED-SHEET PRINTING IN WHICH PREDETERMINED PRINT SETTING IS DIFFERENT AMONG PAGES, CONTROL METHOD FOR INFORMATION PROCESSING APPARATUS, AND STORAGE MEDIUM

BACKGROUND OF THE INVENTION

Field of the Invention

The present invention relates to an information processing apparatus, a control method for the information processing apparatus, and a storage medium.

Description of the Related Art

An information processing apparatus such as a client terminal equipped with a general purpose printer driver, which uses an industry-standard protocol such as the internet printing protocol (IPP), is known. Examples of the general purpose printer driver include a local printer driver that is directly connected to a printer, and a cloud printer driver that transmits print data to a cloud print service.

The general purpose printer driver is able to communicate with, for example, printers provided by a plurality of printer vendors, and hence by using the general purpose printer driver included in the information processing apparatus, a user is able to transmit the print data from the information processing apparatus to the printer or the cloud printer service without installing a vendor-specific printer driver in the information processing apparatus.

On the other hand, since the general purpose printer driver needs to generate print data interpretable by printers provided by various printer vendors, functions of the general purpose printer driver are limited, and hence setting items that can be set as print settings are limited. In order to extend functions of the information processing apparatus equipped with such the general purpose printer driver, an extension application that extends a print setting function is installed in the information processing apparatus (see, for example, Japanese Patent Laid-Open Publication (Kokai) No. 2021-124791). As a result, the information processing apparatus is able to realize display control of a user interface (UI) on which vendor-specific print settings can be configured and generation of print data including the vendor-specific print settings based on setting values set on the UI.

According to the prior art described above, however, there may be a case that it is not possible to implement mixed-sheet printing in which a plurality of pages is printed and a predetermined print setting such as a sheet setting is different among the plurality of pages. For example, in the case that the printer designated by the user does not have the capability of the mixed-sheet printing, even though the information processing apparatus is able to generate print data corresponding to the mixed-sheet printing, it is not possible to implement the mixed-sheet printing.

SUMMARY OF THE INVENTION

The present invention provides an information processing apparatus that is capable of implementing mixed-sheet printing in which a predetermined print setting is different among pages, a control method for the information processing apparatus, and a storage medium.

Accordingly, the present invention provides an information processing apparatus that causes a printing apparatus to execute mixed-sheet printing, in which printing of a plurality of pages is performed and a predetermined print setting is different among the pages, the information processing apparatus comprising a controller configured or programmed to function as an obtaining unit that obtains intermediate data including the predetermined print setting of each of the plurality of pages, a determining unit that determines whether or not the printing apparatus has a capability of the mixed-sheet printing, a generating unit that generates print data for causing the printing apparatus to execute the mixed-sheet printing based on the intermediate data, and a transmitting unit that transmits the print data generated by the generating unit to the printing apparatus. In a case that the printing apparatus does not have the capability of the mixed-sheet printing, the generating unit obtains the predetermined print settings included in the intermediate data in order of the pages to be printed, and generates a plurality of pieces of print data based on a plurality of pieces of divided intermediate data obtained by dividing the intermediate data based on differences among the predetermined print settings of the plurality of pages.

According to the present invention, it is possible to implement the mixed-sheet printing in which the predetermined print setting is different among the pages.

Further features of the present invention will become apparent from the following description of exemplary embodiments with reference to the attached drawings.

BRIEF DESCRIPTION OF THE DRAWINGS

FIG. 4 is a diagram that shows an example of capability information of the cloud print compatible printer shown in FIG. 1.

FIGS. 6A to 6C is a diagram that shows an example of device capability information in an initial state, which is bundled with an OS of the client terminal shown in FIG. 1.

FIGS. 6D to 6F is a diagram that shows an example of device capability information that has been updated by using capability information obtained from a cloud print service of the cloud print server shown in FIG. 1.

FIG. 7 is a diagram that shows an example of an extension setup information file.

DESCRIPTION OF THE EMBODIMENTS

The present invention will now be described in detail below with reference to the accompanying drawings showing embodiments thereof.

First, a first embodiment of the present invention will be described.

Figure 1:
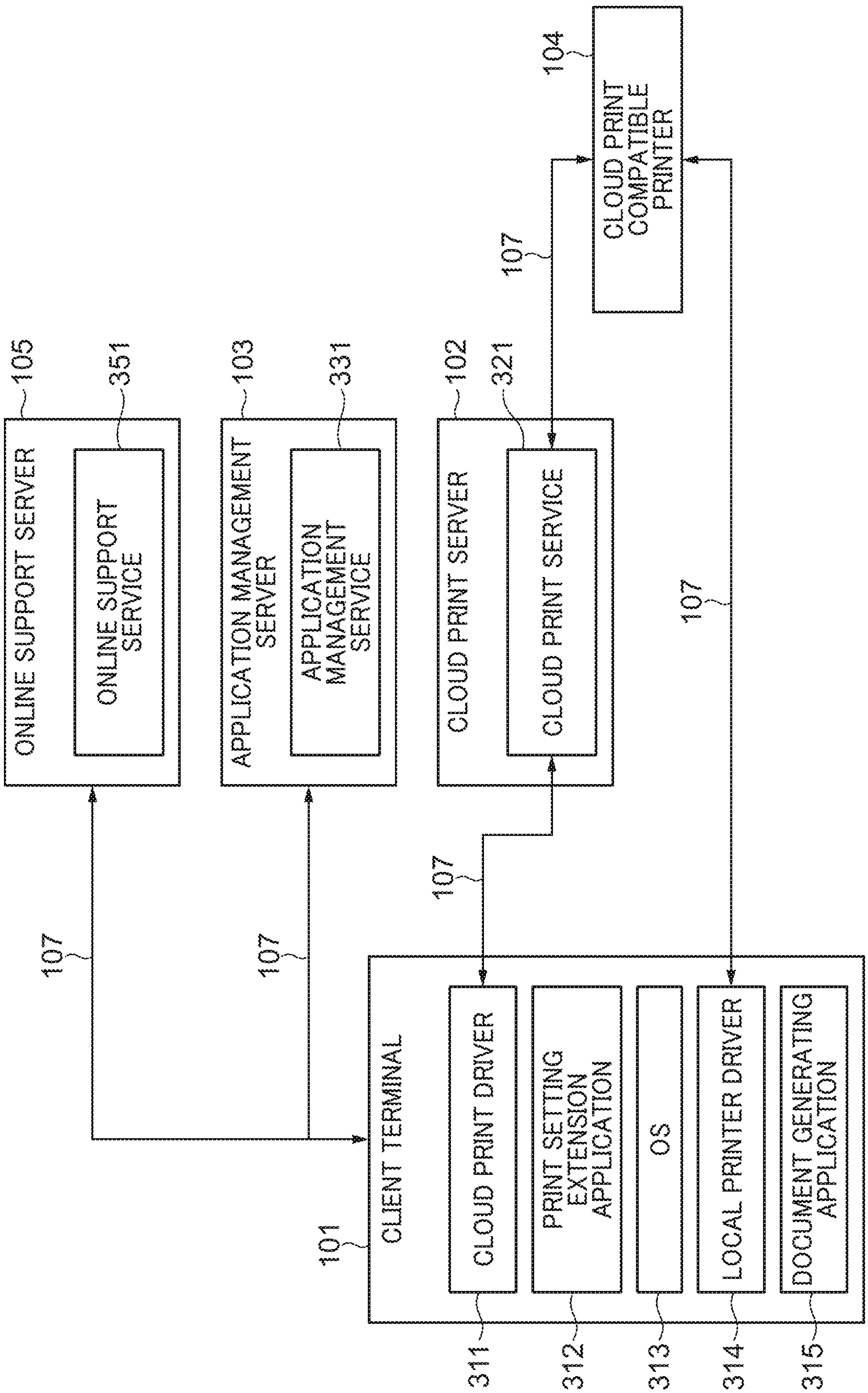
FIG. 1 is a diagram that shows an example of a configuration of a printing system including a client terminal that is an information processing apparatus according to a first embodiment of the present invention.

FIG. 1 is a diagram that shows an example of a configuration of a printing system including a client terminal 101 that is an information processing apparatus according to the first embodiment of the present invention. In this printing system, the client terminal 101, a cloud print server 102, an application management server 103, a cloud print compatible printer 104, and an online support server 105 are connected to each other via a network 107. The network 107 is assumed to be a wide area network (WAN) such as the Internet, but may be a closed environment such as an in-house network (an in-house local area network).

It should be noted that in FIG. 1, although one client terminal 101 and one cloud print compatible printer 104 are shown, a plurality of client terminals 101 and a plurality of cloud print compatible printers 104 may be shown.

In addition, the cloud print server 102, the application management server 103, and the online support server 105 may be a server system that includes a plurality of information processing apparatuses. By the cloud print server 102, the application management server 103, and the online support server 105 being the server system that includes the plurality of information processing apparatuses, the processing load can be distributed among the plurality of information processing apparatuses. Moreover, the cloud print server 102, the application management server 103, and the online support server 105 may be virtually configured inside one physical information processing apparatus.

The client terminal 101, which is the information processing apparatus such as a personal computer (PC), a tablet, or a smartphone, is a terminal that is directly operated by a user. Arbitrary application software is executable on the client terminal 101. The client terminal 101 includes an operating system (OS) 313, a cloud printer driver 311, a local printer driver 314, a print setting extension application 312, and a document generating application 315 as basic software.

The cloud print compatible printers 104 is a device that actually performs printing on recording media such as sheets and is an image forming apparatus that converts print data received via the network 107 into image data and prints the image data on the sheets. The cloud print compatible printers 104 receives print data, which has been generated by the cloud printer driver 311 of the client terminal 101, via the cloud print server 102. In addition, the cloud print compatible printers 104 directly receives print data, which has been generated by the local printer driver 312 of the client terminal 101, from the client terminal 101 without via the cloud print server 102.

The cloud print server 102 is a server apparatus, which provides a cloud print service 321, and receives a print instruction and the print data from the outside. Furthermore, the cloud print server 102 transmits the received print data to a designated printer, for example, the cloud print compatible printers 104.

The application management server 103, which is a server apparatus that provides an application management service 331, holds and manages various kinds of applications. The application management server 103 receives identification information of an application and a download request of the application from the client terminal 101, and then transmits the application identified from the received identification information to the client terminal 101.

The online support server 105, which is a server apparatus that provides an online support service 351, provides the client terminal 101 with an extension setup information file in which information for extending functions of the client terminal 101 has been described.

FIGS. 2A, 2B, 2C, 2D, and 2E are block diagrams that schematically show hardware configurations of the client terminal 101, the cloud print server 102, the application management server 103, the cloud print compatible printer 104, and the online support server 105, which are shown in FIG. 1, respectively.

Figure 2A:
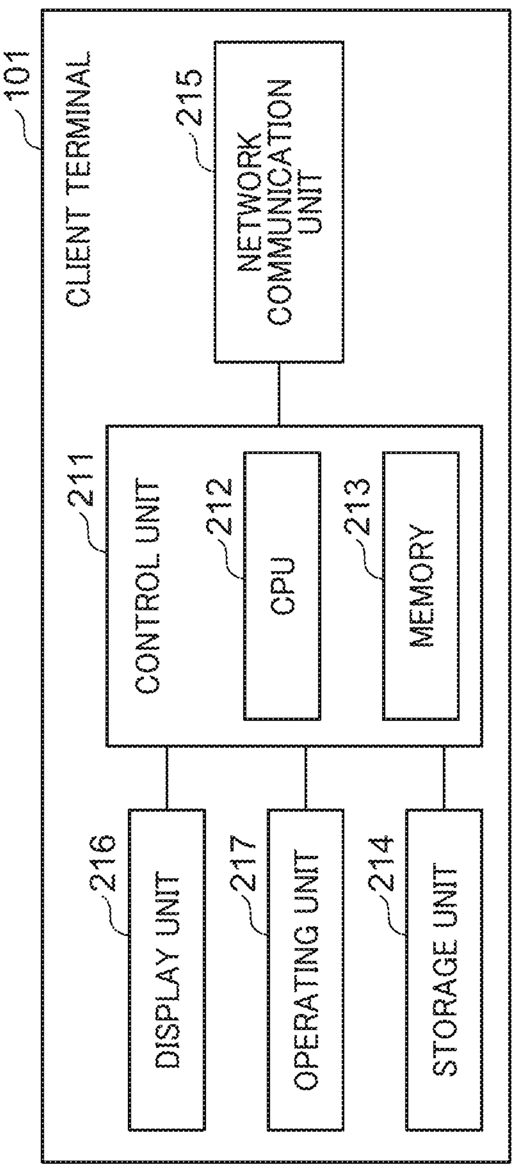
FIGS. 2A, 2B, 2C, 2D, and 2E are block diagrams that schematically show hardware configurations of the client terminal, a cloud print server, an application management server, a cloud print compatible printer, and an online support server, which are shown in FIG. 1, respectively.

FIG. 2A is the block diagram that shows the hardware configuration of the client terminal 101. As shown in FIG. 2A, the client terminal 101 includes a control unit 211, a storage unit 214, a network communication unit 215, a display unit 216, and an operating unit 217. The control unit 211 is connected to the storage unit 214, the network communication unit 215, the display unit 216, and the operating unit 217.

The control unit 211 includes a central processing unit (CPU) 212 and a memory 213, and controls the overall operation of the client terminal 101. The CPU 212 loads a program stored in the storage unit 214 into the memory 213 and executes the program loaded into the memory 213. The memory 213, which is a main memory of the CPU 212, is used as a working area, and a temporary storage area for loading various kinds of programs. The storage unit 214 is a nonvolatile storage device such as a hard disk or a solid state drive (an SSD), and stores digital data. The network communication unit 215 performs input/output of the digital data into/from the cloud print server 102, the application management server 103, the cloud print compatible printer 104, the online support server 105, and so forth via the network 107. The display unit 216 is a device such as a liquid crystal display for displaying visual information. The operating unit 217 is a device such as a keyboard or a mouse which accepts input operations from the user. It should be noted that a device such as a touch panel which is equipped with the functions of both the display unit 216 and the operating unit 217 may be used.

Figure 2B:
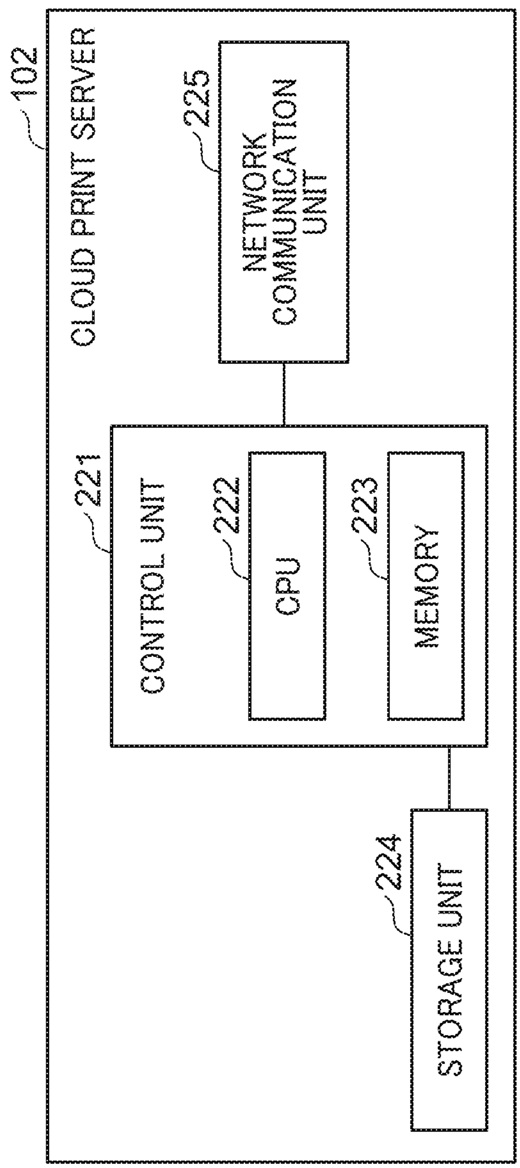

Next, the hardware configuration of the cloud print server 102 will be described. FIG. 2B is the block diagram that shows the hardware configuration of the cloud print server 102. As shown in FIG. 2B, the cloud print server 102 includes a control unit 221, a storage unit 224, and a network communication unit 225. The control unit 221 is connected to the storage unit 224 and the network communication unit 225.

The control unit 221 includes a CPU 222 and a memory 223, and controls the overall operation of the cloud print server 102. The CPU 222 loads a program stored in the storage unit 224 into the memory 223 and executes the program loaded into the memory 223. The memory 223, which is a main memory of the CPU 222, is used as a working area, and a temporary storage area for loading various kinds of programs. The storage unit 224 is a non-volatile storage device such as a hard disk or an SSD, and stores digital data. The network communication unit 225 performs input/output of the digital data into/from the client terminal 101, the cloud print compatible printer 104, and so forth via the network 107.

It should be noted that in the description of the first embodiment of the present invention, although the cloud print server 102 is configured by one information processing apparatus that has the hardware configuration shown in FIG. 2B, the cloud print server 102 may be configured by a plurality of information processing apparatuses.

Figure 2C:
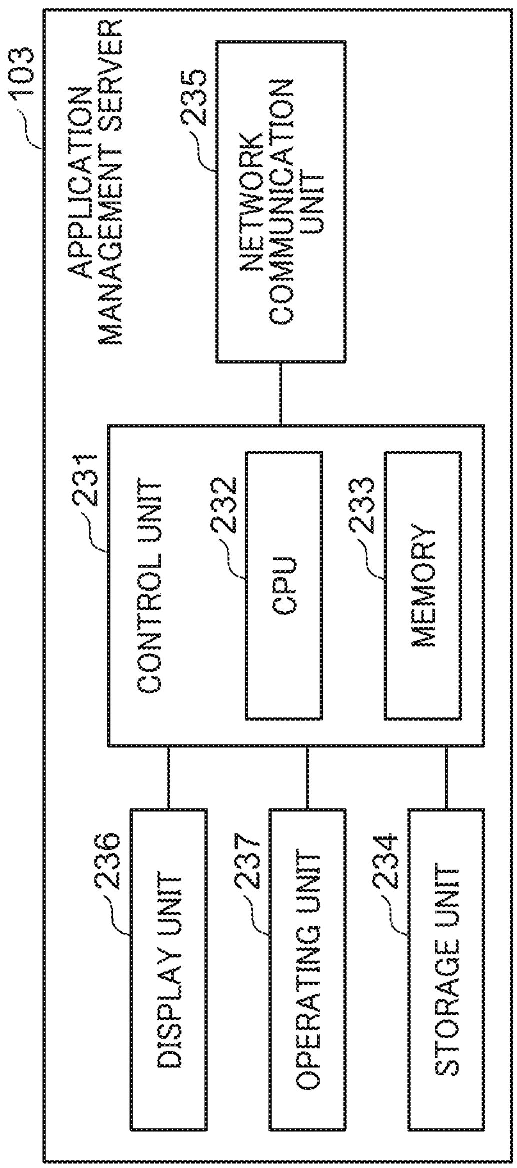

Next, the hardware configuration of the application management server 103 will be described. FIG. 2C is the block diagram that shows the hardware configuration of the application management server 103. As shown in FIG. 2C, the application management server 103 includes a control unit 231, a storage unit 234, a network communication unit 235, a display unit 236, and an operating unit 237. The control unit 231 is connected to the storage unit 234, the network communication unit 235, the display unit 236, and the operating unit 237.

The control unit 231 includes a CPU 232 and a memory 233, and controls the overall operation of the application management server 103. The CPU 232 loads a program stored in the storage unit 234 into the memory 233 and executes the program loaded into the memory 233. The memory 233, which is a main memory of the CPU 232, is used as a working area, and a temporary storage area for loading various kinds of programs. The storage unit 234 is a nonvolatile storage device such as a hard disk or an SSD, and stores digital data. The network communication unit 235 performs input/output of the digital data into/from the client terminal 101 and so forth via the network 107. The display unit 236 is a device such as a liquid crystal display for displaying visual information. The operating unit 237 is a device such as a keyboard or a mouse which accepts input operations from the user. It should be noted that a device such as a touch panel which is equipped with the functions of both the display unit 236 and the operating unit 237 may be used.

It should be noted that in the description of the first embodiment of the present invention, although the application management server 103 is configured by one information processing apparatus that has the hardware configuration shown in FIG. 2C, the application management server 103 may be configured by a plurality of information processing apparatuses.

Figure 2D:
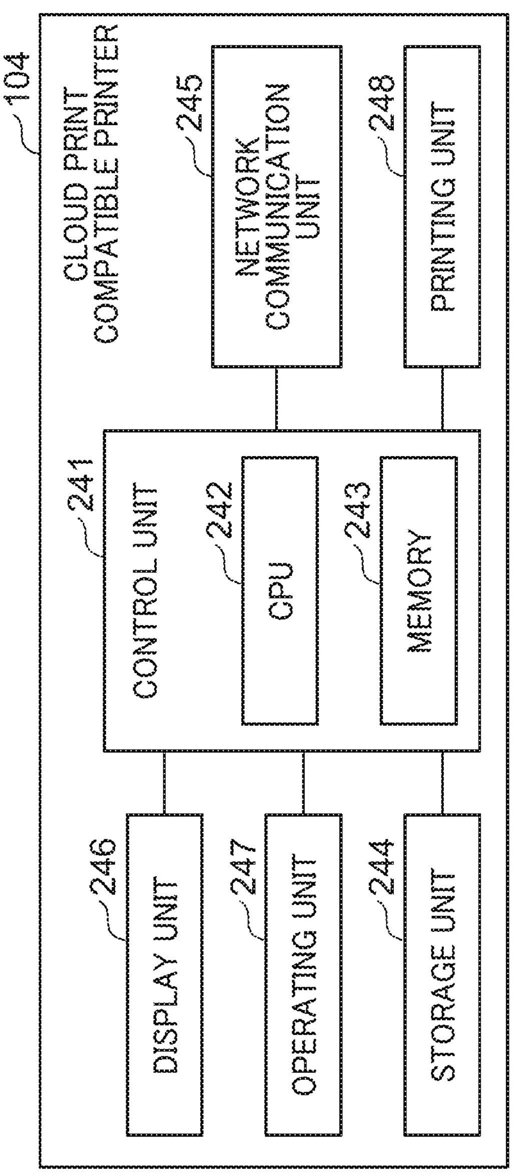

Next, the hardware configuration of the cloud print compatible printer 104 will be described. FIG. 2D is the block diagram that shows the hardware configuration of the cloud print compatible printer 104. As shown in FIG. 2D, the cloud print compatible printer 104 includes a control unit 241, a storage unit 244, a network communication unit 245, a display unit 246, an operating unit 247, and a printing unit 248. The control unit 241 is connected to the storage unit 244, the network communication unit 245, the display unit 246, the operating unit 247, and the printing unit 248.

The control unit 241 includes a CPU 242 and a memory 243, and controls the overall operation of the cloud print compatible printer 104. The CPU 242 loads a program stored in the storage unit 244 into the memory 243 and executes the program loaded into the memory 243. The memory 243, which is a main memory of the CPU 242, is used as a working area, and a temporary storage area for loading various kinds of programs. The storage unit 244 is a nonvolatile storage device such as a hard disk or an SSD, and stores digital data.

The network communication unit 245 carries out communications with apparatuses connected via the network 107. For example, the network communication unit 245 receives the print data from the client terminal 101 and the cloud print server 102 via the network 107. Furthermore, the network communication unit 245 transmits information indicating a status of the cloud print compatible printer 104 such as an error to an external apparatus. The display unit 246 is a device for displaying information, such as a touch panel or a light emitting diode (an LED) that is provided on the cloud print compatible printer 104. The operating unit 247 is a device that accepts input operations from the user, and includes hard keys such as a numeric keypad, and a touch panel.

The printing unit 248 is a device that carries out a printing process by performing a sequence of operations including sheet feeding, printing, and sheet discharging with respect to sheets prepared in a cassette (not shown) or a tray (not shown). The method of the printing is an electrophotographic method, an inkjet method, or the like. A duplex unit that is used for the sheet discharging, and a finishing device that performs stapling, punching, and so forth are also included in the printing unit 248.

It should be noted that in the description of the first embodiment of the present invention, although the cloud print compatible printer 104 is a single function printer equipped with only a printing function, the cloud print compatible printer 104 is not limited to the single function printer. For example, the cloud print compatible printer 104 may be a multi-function printer (a multi-function peripheral) equipped with a scanner function and a fax function as well as the printing function.

Figure 2E:
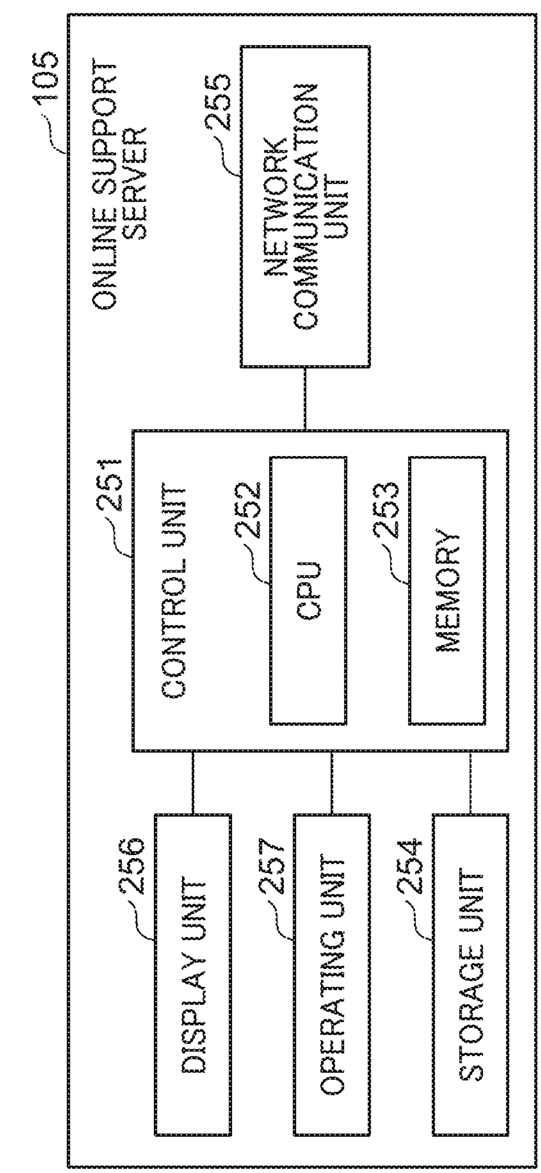

Next, the hardware configuration of the online support server 105 will be described. FIG. 2E is the block diagram that shows the hardware configuration of the online support server 105. As shown in FIG. 2E, the online support server 105 includes a control unit 251, a storage unit 244, a network communication unit 255, a display unit 256, and an operating unit 257. The control unit 251 is connected to the storage unit 254, the network communication unit 255, the display unit 256, and the operating unit 257.

The control unit 251 includes a CPU 252 and a memory 253. The CPU 252 controls the overall operation of the online support server 105. The memory 253 is used in the processing executed by the CPU 252. The storage unit 254 is a memory device such as a hard disk drive (an HDD) or an SSD. The extension setup information file that is a file, in which the information for extending the functions provided by the client terminal 101 has been described, is stored in the storage unit 254. The network communication unit 255 is an interface for the online support server 105 to communicate with the client terminal 101. The online support server 105 receives a request to obtain a file stored in the storage unit 254 from the client terminal 101 via the network communication unit 255 and transmits the file corresponding to the request to the client terminal 101. The display unit 256 is a device such as a liquid crystal display for displaying visual information. The operating unit 257 is a device such as a keyboard or a mouse which accepts input operations from the user. It should be noted that a device such as a touch panel which is equipped with the functions of both the display unit 256 and the operating unit 257 may be used.

It should be noted that in the description of the first embodiment of the present invention, although the online support server 105 is configured by one information processing apparatus that has the hardware configuration shown in FIG. 2E, the online support server 105 may be configured by a plurality of information processing apparatuses.

Next, registration of the cloud print compatible printer 104 in the printing system according to the first embodiment of the present invention will be described.

Figure 3:
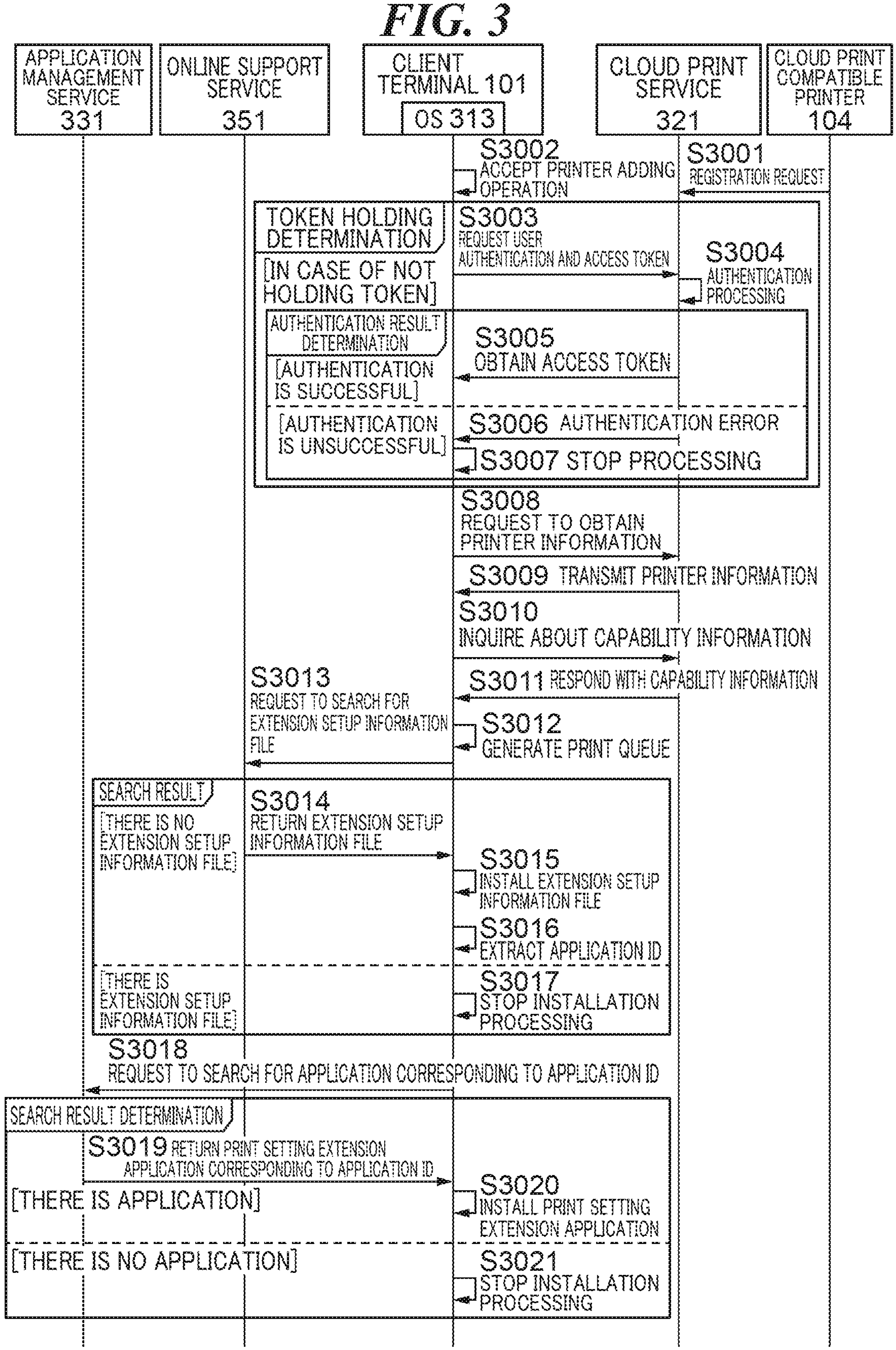
FIG. 3 is a sequence diagram that shows a procedure of a registration processing for the cloud print compatible printer in the printing system of FIG. 1.

FIG. 3 is a sequence diagram that shows a procedure of a registration processing for the cloud print compatible printer 104 in the printing system of FIG. 1. The registration processing for the cloud print compatible printer 104 in FIG. 3 is executed when the cloud print compatible printer 104 has accepted a printer registration operation for registering the cloud print compatible printer 104 in the cloud print service 321 from the user.

As shown in FIG. 3, first, the cloud print compatible printer 104 transmits a printer registration request as well as device identification information to the cloud print service 321 (a step S3001). The device identification information is information for identifying a model of the printer (a printer model) and is, for example, a hardware ID (an HWID) that is assigned to each printer model. It should be noted that the device identification information is not limited to the HWID, but has only to be information that is capable of identifying a printer model.

The cloud print service 321, which has received the printer registration request from the cloud print compatible printer 104, transmits a uniform resource locator (URL) for printer registration to the cloud print compatible printer 104. For example, when the user accesses the URL from the cloud print compatible printer 104, an input screen for inputting a user ID and a password is displayed on the display unit 246 of the cloud print compatible printer 104. The user inputs a user ID and a password for using the cloud print service 321 into the input screen. When user authentication using the user ID and the password that have been inputted is successful, i.e., when login of the user is successful, the cloud print service 321 transmits a request to obtain information required for the printer registration (an obtaining request) to the cloud print compatible printer 104.

In response to this obtaining request, the cloud print compatible printer 104 executes predetermined commands and performs a registration processing for the capability information. The predetermined commands are commands that are prepared in order to register the capability information in the cloud print service 321. The capability information is information that indicates functions installed in the cloud print compatible printer 104, and is information required for the user to set print settings at the time of printing such as double-sided printable information, color printable information, and stapling possible information.

FIG. 4 is a diagram that shows an example of the capability information of the cloud print compatible printer 104 shown in FIG. 1. The capability information includes item names and attribute values. The item names correspond to setting items of the print settings. The attribute values correspond to setting values, options, or value ranges (ranges) that can be set in the setting items.

As the capability information of the cloud print compatible printer 104, in addition to item names and attribute values that are defined as industry-standard specifications by the IPP, the cloud print compatible printer 104 also stores item names and attribute values that are independently defined by the printer vendor. The item names defined as the industry-standard specifications by the IPP are, for example, "sheet size", "sheet type", and "color mode". On the other hand, the item name independently defined by the printer vendor is, for example, "mixed-sheet printing". In the first embodiment of the present invention, the "mixed-sheet printing" is an item for setting whether or not to perform printing according to a sheet size of each page when printing a document in which the sheet size is different among pages. In the first embodiment of the present invention, in the case that the capability information of the printer includes the "mixed-sheet printing", it is assumed that the printer is able to interpret settings (in the first embodiment of the present invention, the sheet sizes) of the respective pages based on the print data and perform the printing according to the settings.

In addition to the "mixed-sheet printing", "save job in printer", "job name abbreviation", and "stapleless binding" are the item names independently defined by the printer vendor. The "save job in printer" is a setting item for setting whether or not to save the print data received by the printer from the cloud print service 321 in the printer even after printing the print data. The "job name abbreviation" is a setting item for setting whether or not to abbreviate a name assigned to the print data and display the abbreviated name when displaying bibliographic information of the print data received by the printer from the cloud print service 321 on the display unit of the printer. The "stapleless binding" is a setting item for setting whether or not to bind output sheets (a printed matter) based on the print data received by the printer from the cloud print service 321 together without using staples. Binding without using staples means binding the output sheets together by, for example, pressure bonding.

It should be noted that printer vendor-independently-defined attribute values (i.e., printer vendor-specific attribute values) may be defined as the attribute values corresponding to the item names defined as the industry-standard specifications by the IPP. For example, "folding setting" is an item name defined by the IPP. On the other hand, "saddle folding", which is one of attribute values of the "folding setting", is a function that folds and outputs (discharges) one or more sheets at once without binding them using staples, and is an attribute value independently defined by the printer vendor (i.e., a printer vendor-specific attribute value).

In the capability information registration processing, the cloud print compatible printer 104 notifies the cloud print service 321 of the capability information according to the IPP as a communication protocol. In the capability information registration processing, the cloud print compatible printer 104 notifies the cloud print service 321 of the item names shown in FIG. 4, and the attribute values and default values, which correspond to the respective item names. The capability information, of which the cloud print service 321 is notified by the cloud print compatible printer 104, is independent of whether or not the respective items and the attribute values are defined by the IPP. For example, the cloud print service 321 is also notified of the item names and the attribute values for the "mixed-sheet printing", the "save job in printer", the "job name abbreviation", and the "stapleless binding" that are shown in FIG. 4. Furthermore, the cloud print service 321 is also notified of the "saddle folding", which is one of the attribute values of the "folding setting" and is the printer vendor-specific attribute value, as one of the attribute values of the "folding setting".

The cloud print service 321 registers the capability information notified from the cloud print compatible printer 104. Specifically, the cloud print service 321 generates a print queue for the cloud print compatible printer 104 and associates the notified capability information with the print queue.

Next, the client terminal 101 accepts a printer adding operation, which is a setup operation of the cloud print compatible printer 104 performed by the user (a step S3002). The printer adding operation is, for example, an operation to select an object on a printer setting screen shown in FIG. 5.

Figure 5:
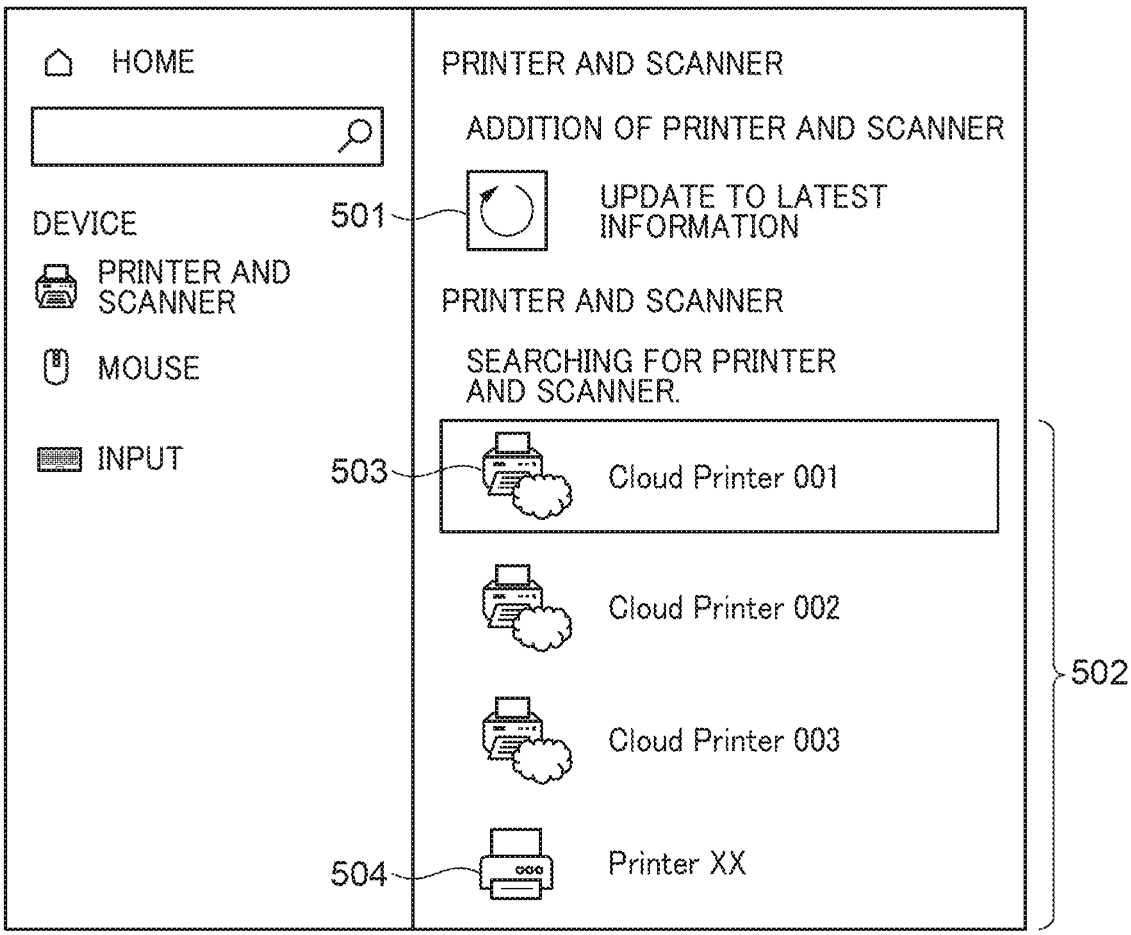
FIG. 5 is a diagram that shows an example of a printer setting screen that is displayed on a display unit shown in FIG. 2A.

FIG. 5 is a diagram that shows an example of the printer setting screen that is displayed on the display unit 216 shown in FIG. 2A. It should be noted that when performing the registration of the cloud print compatible printer 104, in the client terminal 101, a standard printing function, which is one of the functions included the OS 313 of the client terminal 101. By the user selecting an object 501 on the printer setting screen, a printer search instruction is inputted into the OS 313.

The OS 313, which has accepted the printer search instruction, determines whether or not it is holding an access token for the cloud print service 321. In the case of determining that the OS 313 is not holding the access token, the OS 313 displays a screen (not shown) for inputting user information (a login name and a password). The OS 313 transmits the user information inputted into this screen to the cloud print service 321, and requests user authentication and the access token (a step S3003).

The cloud print service 321 carries out an authentication processing that performs the user authentication by using the user information received from the client terminal 101 (a step S3004). Upon completing the authentication processing, the cloud print service 321 notifies the client terminal 101 of the result of the authentication processing.

In the case that the user authentication is successful in the step S3004, the OS 313 of the client terminal 101 obtains the access token from the cloud print service 321 (a step S3005).

On the other hand, in the case that the user authentication is unsuccessful (the user authentication has failed) in the step S3004, the cloud print service 321 notifies the OS 313 of the client terminal 101 of an authentication error (a step S3006). The OS 313 of the client terminal 101 stops the processing based on information on the received authentication error (a step S3007). In the case that the access token cannot be obtained, the OS 313 of the client terminal 101 ends the registration processing for the cloud print compatible printer 104.

In the case that the OS 313 is holding the access token, or in the case that the access token has been obtained in the step S3005, the OS 313 transmits a request to obtain printer information, to which the access token has been attached, to the cloud print service 321 (a step S3008).

In response to the request to obtain the printer information (the obtaining request), the cloud print service 321 transmits the printer information to the client terminal 101 (a step S3009). The printer information is information indicating a printer that the user identified by the access token attached to the obtaining request is permitted to use. The printer information includes a printer name of the printer that the user is permitted to use and an HWID of the printer that the user is permitted to use.

It should be noted that concurrently with the processes performed in the step S3008 and the step S3009, the OS 313 of the client terminal 101 searches for printers connected to the same network 107 to which the client terminal 101 is connected. This search is a device search using mDNS, Bonjour, or the like.

The OS 313 displays a list of printers on an area 502 of the printer setting screen based on the printer information obtained from the cloud print service 321 and information on printers detected by the search for the printers connected to the network 107. Among the printers displayed on the area 502, "Cloud Printer 001", "Cloud Printer 002", and "Cloud Printer 003" are printers indicated by the printer information obtained from the cloud print service 321, that is, printers whose capability information has already been registered in the cloud print service 321. Examples of an icon displayed for such printers include an icon 503 shown in FIG. 5. Furthermore, "Printer XX" is a printer detected by the client terminal 101 searching the network 107, that is, a printer whose capability information has not yet been registered in the cloud print service 321. Examples of an icon displayed for such a printer include an icon 504 shown in FIG. 5. Thus, in the first embodiment of the present invention, the icons with different shapes are displayed for the printer whose capability information has already been registered in the cloud print service 321 and the printer whose capability information has not yet been registered in the cloud print service 321. Therefore, based on the shape of the icon, the user is able to easily identify whether or not the capability information of the printer displayed on the area 502 has already been registered in the cloud print service 321. It should be noted that only the icons for the printers whose capability information has already been registered in the cloud print service 321 may be displayed on the area 502 of the printer setting screen.

In the area 502, the user selects the icon corresponding to the printer that the user wants to register in the client terminal 101, for example, selects the icon for the cloud print compatible printer 104.

The OS 313 of the client terminal 101 inquires of the cloud print service 321 about the capability information of the cloud print compatible printer 104 corresponding to the icon selected by the user (a step S3010). Which setting items in the capability information the OS 313 inquires about are determined by the specifications of the OS 313 and are set in the OS 313 in advance. In the step S3010, the OS 313 specifies the setting items set in advance and inquires of the cloud print service 321 about the capability information of the cloud print compatible printer 104. The setting items set in advance are setting items defined as standard specifications by the IPP, and are, for example, the setting items such as the "sheet size", the "sheet type", and the "color mode".

The cloud print service 321 responds to the client terminal 101 with the capability information of the cloud print compatible printer 104 (a step S3011). It should be noted that in the first embodiment of the present invention, although the capability information registered in the cloud print service 321 at the time of registration in the step S3001 is transmitted to the client terminal 101 in the step S3011, the capability information registered in the cloud print service 321 may be transmitted to the client terminal 101 at a timing other than the time of registration in the step S3001. For example, when the capability information of the cloud print compatible printer 104 is changed, the changed capability information registered in the cloud print service 321 may be transmitted to the client terminal 101. Furthermore, the user may issue an instruction to update the capability information on a user interface provided by the cloud print service 321, and the capability information updated according to the instruction to update the capability information may be transmitted to the client terminal 101.

Furthermore, the cloud print service 321 may obtain the capability information from the cloud print compatible printer 104 at the timing of the step S3010, and may transmit the obtained capability information to the client terminal 101.

In the step S3011, the cloud print service 321 responds to the client terminal 101 with the attribute values and the default values, which correspond to the setting items designated by the client terminal 101. Here, the attribute values with which the cloud print service 321 responds to the client terminal 101 are all the attribute values registered in the cloud print service 321 irrespective of whether or not they are the attribute values defined as standards. The default values are values that are initially set when the client terminal 101 displays the print setting screen. It should be noted that in the case that the attribute values for the setting items about which the client terminal 101 has inquired are not stored in the cloud print service 321, the cloud print service 321 does not respond to the OS 313.

Next, based on the device identification information and the printer name of the printer corresponding to the icon selected by the user, the OS 313 starts installation of the cloud printer driver 311. Next, the OS 313 generates a print queue of the cloud printer driver 311 having basic device capability information bundled with the OS 313 (a step S3012).

The device capability information means definition information required to generate print setting capability information of the printer driver, and means, for example, information described in extensible markup language (XML) such as PrintDeviceCapabilities.

FIGS. 6A to 6C is a diagram that shows an example of the device capability information in an initial state, which is bundled with the OS 313 of the client terminal 101 shown in FIG. 1. For example, in 601 of the device capability information shown in FIG. 6B, "Feature" indicates that "PageMediaSize" representing the sheet size is a setting item. "Option" indicates options corresponding to the "PageMediaSize". As shown in FIG. 6B, in initial values of the device capability information, as the sheet size, there are only two options, that is, "A4" (ISOA4) and "LETTER" (NorthAmericaLetter). This information is stored in association with the print queue when the print queue is generated, and is managed by the OS 313. It should be noted that the device capability information in the initial state is device capability information that is fixed irrespective of the information on the connected printer.

Next, the OS 313 uses the capability information obtained from the cloud print service 321 to update the device capability information constituting the cloud printer driver 311.

FIGS. 6D to 6F is a diagram that shows an example of the device capability information that has been updated by using the capability information obtained from the cloud print service 321 of the cloud print server 102 shown in FIG. 1. For example, in 602 of the device capability information shown in FIG. 6E, with respect to the "PageMediaSize" representing the sheet size, as a sheet size printable by the cloud print compatible printer 104, "Option" other than "A4" and "LETTER" is appended. Furthermore, in 603 shown in FIG. 6F, "ns0000: MixedPageMediaPrinting" indicating whether or not to perform the mixed-sheet printing, "ns0000: Off" and "ns0000: On" that are its "Option", and so forth are appended. In this way, first, the client terminal 101 associates the cloud printer driver 311 with the device capability information bundled with the OS 313, and registers them in the print queue. Then, the device capability information associated with the print queue is updated by the capability information obtained from the cloud print service 321. At this time, the OS 313 updates the device capability information by using only the attribute values defined by the industry-standard specifications among the capability information obtained from the cloud print service 321. For this reason, for example, in the obtaining of the capability information, even in the case that the vendor-specific attribute values are obtained as the sheet type, the vendor-specific attribute values will not be added to the device capability information. By doing so, it becomes possible to set print setting values that cannot be set by the device capability information bundled with the OS 313.

With the above steps, the installation of the cloud printer driver 311 is completed. By performing the processing up to here, it becomes possible to transmit the print data from the client terminal 101 to the print queue for the cloud print compatible printer 104 generated in the cloud print service 321.

Next, the OS 313 starts an installation processing of an application that is associated with the cloud print compatible printer 104 and extends functions of the cloud printer driver 311.

First, the OS 313 carries out an identification additional information adding processing with respect to the device identification information. The identification additional information adding processing is a processing required when obtaining an extension setup information file 700 shown in FIG. 7, which will be described below, from the online support server 105, and the identification additional information adding processing generates a character string different from normal device identification information. In the first embodiment of the present invention, in order to distinguish from applications of other devices, the OS 313 adds identification additional information ("PrinterApp_"), which indicates that it is the application corresponding to the printer, to the device identification information. It should be noted that the "PrinterApp_" is an example and may be another character string, a number, or a mark. For example, in the case that the device identification information of the cloud print compatible printer 104 is device001, by the identification additional information adding processing, the device identification information becomes PrinterApp_device001.

The OS 313 transmits a request to search for the extension setup information file 700 shown in FIG. 7, which includes targeted device identification information with the identification additional information (a step S3013). As a result of the step S3013, the online support service 351 is notified of "PrinterApp_device001" with the identification additional information.

FIG. 7 is a diagram that shows an example of the extension setup information file 700. The extension setup information file 700 is stored in the online support service 351. The extension setup information file 700 is a file that is created by the vendor of the cloud print compatible printer 104. In the extension setup information file 700, an application identifier for identifying the print setting extension application, which is used to set the print data that will be transmitted to the cloud print compatible printer 104, has been described. In the extension setup information file 700 shown in FIG. 7, an item "PackageFamilyName" is identification information of the print setting extension application. Furthermore, in "PrinterHardwareId", a character string, in which the identification additional information is added to the identification information of the cloud print compatible printer 104, has been described.

It should be noted that in the online support service 351, in addition to the extension setup information file 700, in which the identification information of the print setting extension application has been described, the extension setup information file, in which the identification information of the printer driver has been described, has been stored. In the extension setup information file in which the identifier of the printer driver has been described, the identifier of the printer driver has been described in the "PackageFamilyName". Furthermore, in "PrinterHardwareId" of this extension setup information file, device identification information that does not include the identification additional information has been described.

As described above, both the extension setup information file, in which the identifier of the printer driver has been described, and the extension setup information file, in which the identifier of the print setting extension application has been described, have been stored in the online support service 351. Thus, in order to obtain a necessary extension setup information file as appropriate, the OS 313 controls whether or not to add the identification additional information to the device identification information.

The online support service 351, which has received the search request, identifies the extension setup information file in which the "PackageFamilyName" within the file matches the device identification information with the identification additional information designated by the search request.

As a result of the search, in the case that the extension setup information file 700 including the targeted device identification information has been stored in the online support service 351, the online support service 351 returns the extension setup information file 700 to the OS 313 (a step S3014). At this time, the contents of the extension setup information file 700 are written into the registry of the OS 313. Next, the OS 313 associates the extension setup information file 700 obtained from the online support service 351 with the print queue generated in the step S3012, and installs the extension setup information file 700 (a step S3015). Next, the OS 313 extracts an application ID from the extension setup information file 700 (a step S3016). The application ID is an identifier defined by the "PackageFamilyName" in the extension setup information file 700. The processing so far is the processing performed in the case that the extension setup information file 700 including the targeted device identification information has been stored in the online support service 351.

On the other hand, as the result of the search, there is a case that the extension setup information file 700 including the targeted device identification information has not been stored in the online support service 351. The OS 313 carries out the process of a step S3017 in the case that it could not receive the extension setup information file 700 within a predetermined time period after the issuance of the search request in the step S3013, or in the case that it has received an error notification from the online support service 351. In the step S3017, the OS 313 completes the installation of the cloud printer driver, and stops the installation processing of the application.

Further, in the case that the extension setup information file 700 has been obtained from the online support service 351 and the application ID has been extracted in the step S3016, the OS 313 carries out the process of a step S3018. In the step S3018, the OS 313 transmits a request to search for an application corresponding to the extracted application ID to the application management service 331. The application management service 331 stores applications, which run on the client terminal 101, and application IDs, which are identifiers of the applications, in association with each other. The applications and the application IDs have been registered in advance in the application management service 331 by the vendor that provides the cloud print compatible printer 104.

In the case that the print setting extension application 312 corresponding to the application ID designated by the client terminal 101 is held in the application management service 331, the application management service 331 returns the print setting extension application 312 to the client terminal 101 (a step S3019). The OS 313 installs the obtained print setting extension application 312 in association with the print queue on the client side (a step S3020). The OS 313 stores the application ID as information of the print queue in the registry. Furthermore, the print setting extension application 312 is set in the OS 313 so that it provides an event notification to the OS 313 at a timing when the print queue associated with this application is set on the print setting screen. After the power of the client terminal 101 is turned on and the OS 313 is started, the installed print setting extension application 312 is started, and after the print setting extension application 312 is started, it runs as a background task.

On the other hand, there is a case that the print setting extension application 312 corresponding to the application ID designated by the client terminal 101 is not held in the application management service 331. The OS 313 stops the installation processing of the application in the case that it could not obtain the application within a predetermined time period after the issuance of the search request in the step S3018, or in the case that it has received an error notification from the application management service 331 (a step S3021). In this case, the generated print queue and the cloud printer driver 311 are installed in association with each other, and the processing is ended without the print setting extension application 312 being associated with the print queue.

It should be noted that although in the above description, the predetermined character string is added to the device identification information of the cloud print compatible printer 104 to search for the extension setup information file, this is not limitative. For example, in the case that the file for the installation of the printer driver is distinguishable, the search may be conducted without adding the predetermined character string.

Next, a processing of transmitting the print data from the client terminal 101 to the cloud print compatible printer 104 in the first embodiment of the present invention will be described.

Figure 8:
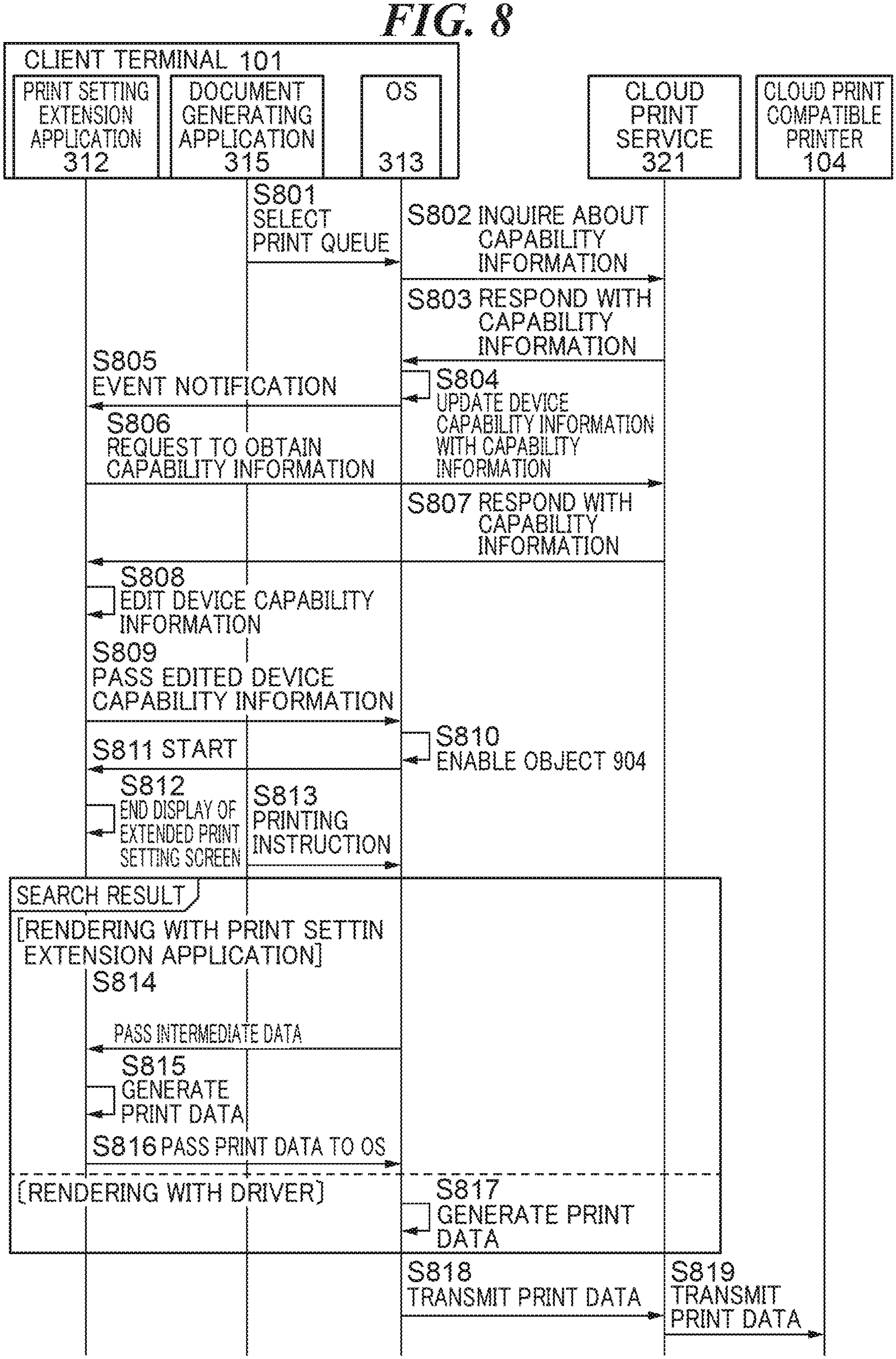
FIG. 8 is a sequence diagram that shows a procedure of a print data transmission control processing in the printing system shown in FIG. 1.

FIG. 8 is a sequence diagram that shows a procedure of a print data transmission control processing in the printing system shown in FIG. 1. It should be noted that in the print data transmission control processing of FIG. 8, it is assumed that the registration processing of the cloud print compatible printer 104, which has been described and is shown in FIG. 3, has already been carried out. The print data transmission control processing of FIG. 8 is carried out when the client terminal 101 has accepted a print queue selecting operation performed by the user on a print setting initial screen shown in FIG. 9, which is displayed on the display unit 216. The print setting initial screen is a screen for allowing the user to select the print queue. An object 901 for selecting the print queue, an object 902 for performing various kinds of print settings, a print preview image 903, and so forth are displayed on the print setting initial screen. The print setting initial screen is displayed on the display unit 216 in accordance with, for example, an instruction from the document generating application 315 of the client terminal 101. It should be noted that the print setting initial screen may be configured to be displayed on the display unit 216 according to an instruction from the OS 313. The document generating application 315 is a document data creating application, a presentation material creating application, a photo/image data display application, or the like.

As shown in FIG. 8, first, the OS 313 of the client terminal 101 selects a print queue associated with a printer set as a default printer (a step S801). In the first embodiment of the present invention, as an example, it is assumed that the cloud print compatible printer 104 is selected as the default printer. It should be noted that the processes of the step S801 and the subsequent steps are also carried out in the case that the user has changed the printer to be used by operating the object 901.

Next, the OS 313 inquires of the cloud print service 321 about the capability information of the cloud print compatible printer 104 (a step S802). Which setting items in the capability information the OS 313 inquires about are determined by the specifications of the OS 313 in advance. The capability information obtained at this timing is information of the same setting items as those obtained in the step S3001 of FIG. 3. In the step S802, the inquiry is made by using, for example, a command according to the standard protocol defined by the IPP such as Get-Pinter-Attributes. In the case that the Get-Pinter-Attributes is used, the OS 313 makes the inquiry about information of the setting items, which are determined in advance, in list format.

The cloud print service 321 responds to the OS 313 with the capability information of the cloud print compatible printer 104 based on the list transmitted by the Get-Pinter-Attributes (a step S803). For example, it is assumed that a media size attribute is designated by the Get-Pinter-Attributes (the IPP). In the case that the cloud print service 321 is holding the media size attribute, the cloud print service 321 responds to the OS 313 with a value (A4, B5, Letter, or the like) associated with the media size attribute. On the other hand, in the case that the cloud print service 321 is not holding the media size attribute, the cloud print service 321 does not respond to the OS 313 with the value associated with the media size attribute. It should be noted that the capability information obtained in the step S803 is the capability information corresponding to the list transmitted from the OS 313 irrespective of the type and the capability of the printer.

The OS 313 updates the device capability information by using the capability information obtained from the cloud print service 321. The OS 313 adds the capability information obtained in the step S803 to the device capability information generated in the step S3012 of FIG. 3 (a step S804). In the case that there is an update to the device capability information, by carrying out the process of the step S803, it is possible to update the device capability information managed by the client terminal 101. It should be noted that in the update of the device capability information in the step S804, the device capability information is updated for only the attribute values defined by the industry-standard specifications.

Next, the OS 313 provides an event notification to the print setting extension application 312 (a step S805). Specifically, the OS 313 notifies the print setting extension application 312 of an event and an application programming interface (an API), which is used to edit the device capability information.

Upon receiving this event, the print setting extension application 312 inquires of the cloud print service 321 about the capability information of the cloud print compatible printer 104 (a step S806). In the step S806, the inquiry about the capability information of printer vendor-specific setting items and setting items including the printer vendor-specific attribute values is made. Even in the step S806, as with the step S802, the inquiry is made by using the Get-Pinter-Attributes, and the capability information is obtained by designating the item names of the setting items to be inquired about as item names. It should be noted that although in the first embodiment of the present invention, the capability information of the printer vendor-independently-defined setting items and the setting items including the printer vendor-independently-defined attribute values is obtained in the step S806, this is not limitative. In the step S806, for example, the setting items that have already been obtained in the obtainment of the capability information by the OS 313 may be obtained as well.

Upon receiving the inquiry from the print setting extension application 312, the cloud print service 321 responds to the print setting extension application 312 (a step S807). It should be noted that the response method used here is the same as in the step S803 described above. In the first embodiment of the present invention, in the step S807, the cloud print service 321 transmits the capability information of the cloud print compatible printer 104, which is stored in the cloud print service 321, as a response. It should be noted that in the step S807, upon receiving the inquiry from the print setting extension application 312, the cloud print service 321 may obtain the capability information from the cloud print compatible printer 104 and may transmit the obtained capability information to the print setting extension application 312.

Upon obtaining the capability information from the cloud print service 321, the print setting extension application 312 edits the device capability information, which is managed by the OS 313, via a configuration information object (a step S808). The configuration information object is a data group required to edit the device capability information. The print setting extension application 312 cannot directly edit the device capability information held by the OS 313. For this reason, the print setting extension application 312 uses the configuration information object to change the device capability information held by the OS 313. For example, the print setting extension application 312 edits the device capability information by converting the capability information such as the "stapleless binding", the "save job in printer", and the "mixed-sheet printing" that are obtained in the step S807 into the device capability information and adding the converted device capability information to the configuration information object. By carrying out the processes up to the step S808, the printer vendor-specific setting items and the printer vendor-specific attribute values as well as the capability information of the standard setting items obtained through the inquiry made by the OS 313 are added to the device capability information.

Next, the print setting extension application 312 passes the edited device capability information to the OS 313 (a step S809). The OS 313 stores the device capability information, which has been obtained from the print setting extension application 312, in association with the print queue.

Upon updating the device capability information, the OS 313 enables an object that triggers a UI screen of the print setting extension application 312 to be displayed (a step S810). The object that triggers the UI screen of the print setting extension application 312 to be displayed is, for example, the object 904 on the print setting initial screen shown in FIG. 9. The object 901 is grayed out until the process of the step S801 is completed, and even in the case that the user clicks the object 904, the UI screen of the print setting extension application 312 will not be displayed. When the process of the step S801 is completed, the object 904 is no longer grayed out (the object 904 becomes able to be clicked), and the user becomes able to select the object 904.

When the object 904 is selected by the user, the OS 313 starts the print setting extension application 312 (a step S811). The started print setting extension application 312 displays the UI screen of the print setting extension application 312, and more specifically, displays an extended print setting screen shown in FIG. 10A on the display unit 216. This extended print setting screen is not reliant on the type of the document generating application 315 to be used.

Figure 11A:
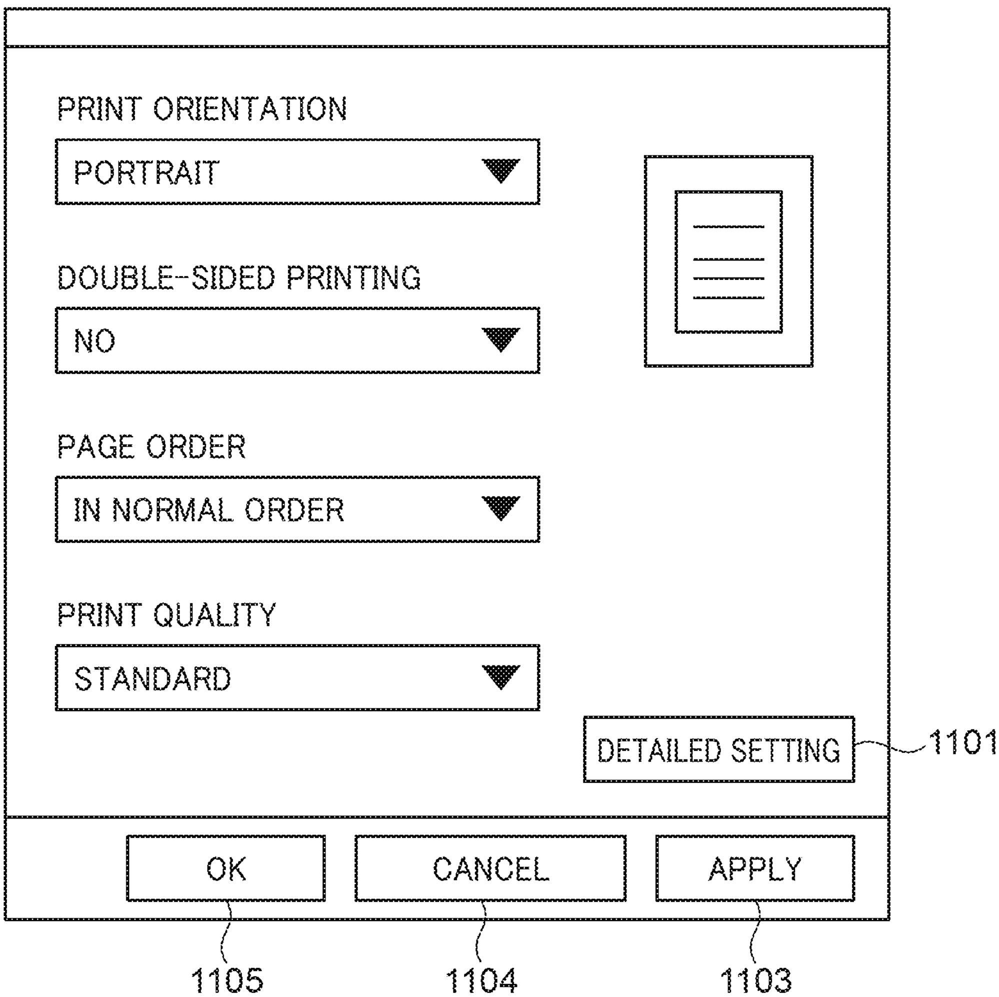
FIGS. 11A, 11B, 11C, and 11D are diagrams that show examples of screens that are displayed on the display unit shown in FIG. 2A.
Figure 11B:
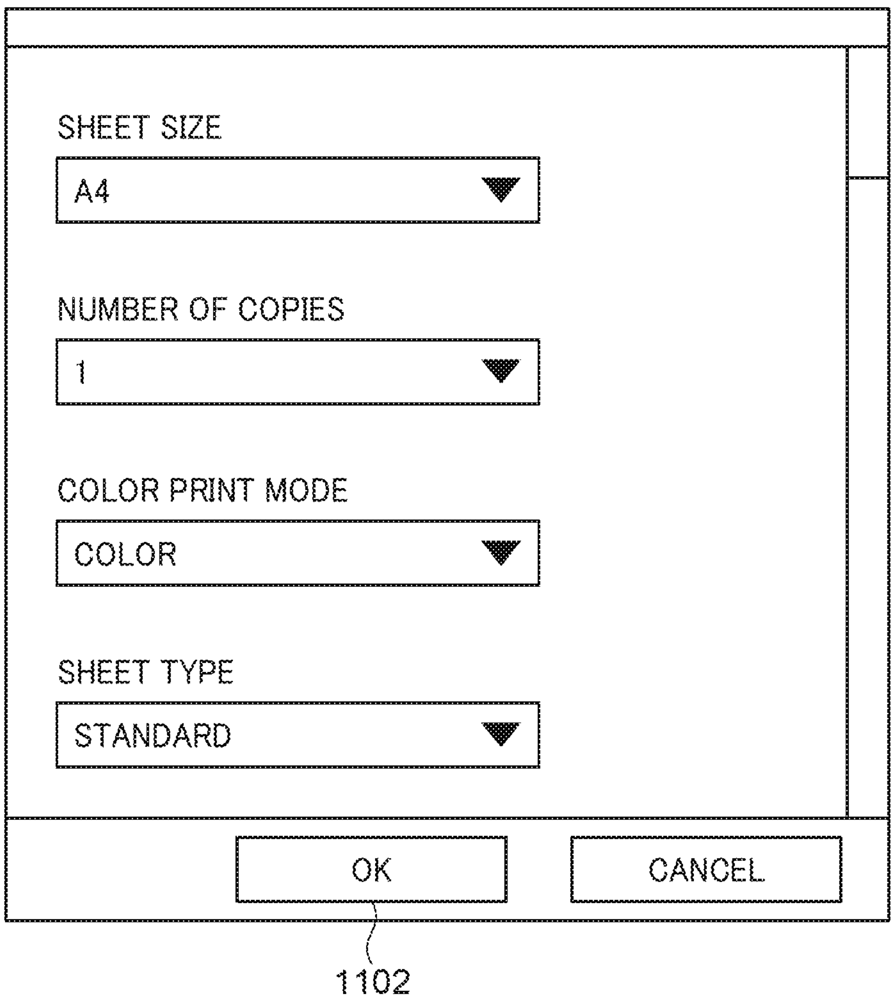
Figure 11C:
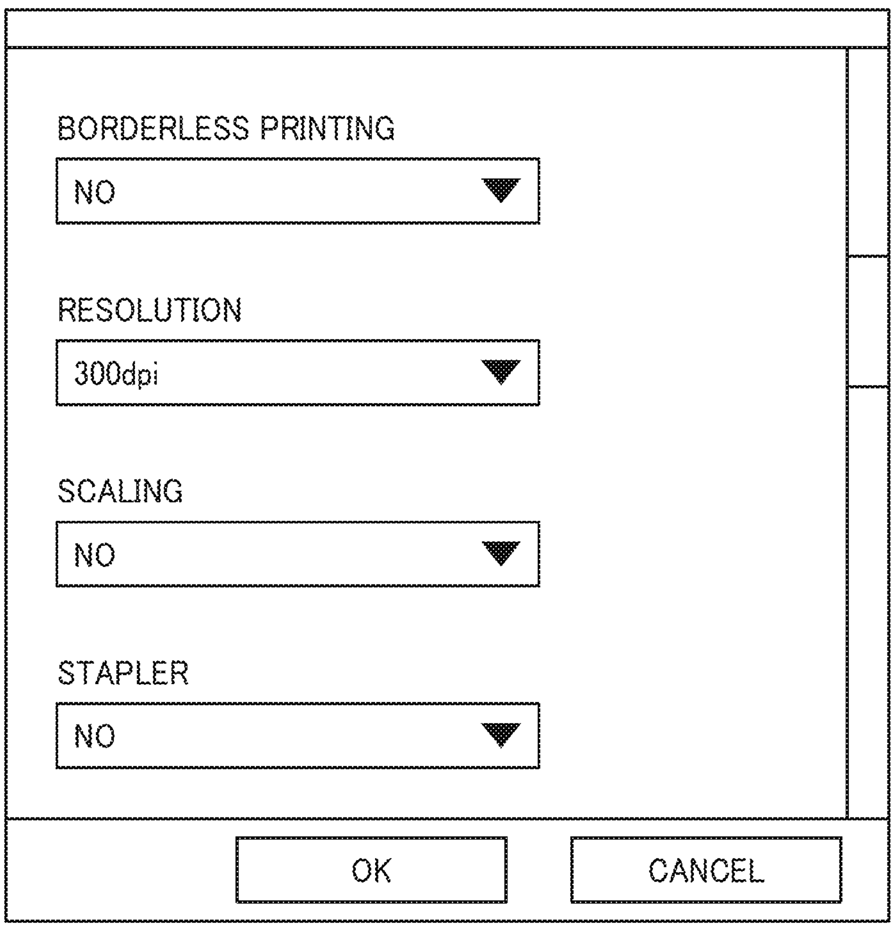
Figure 11D:
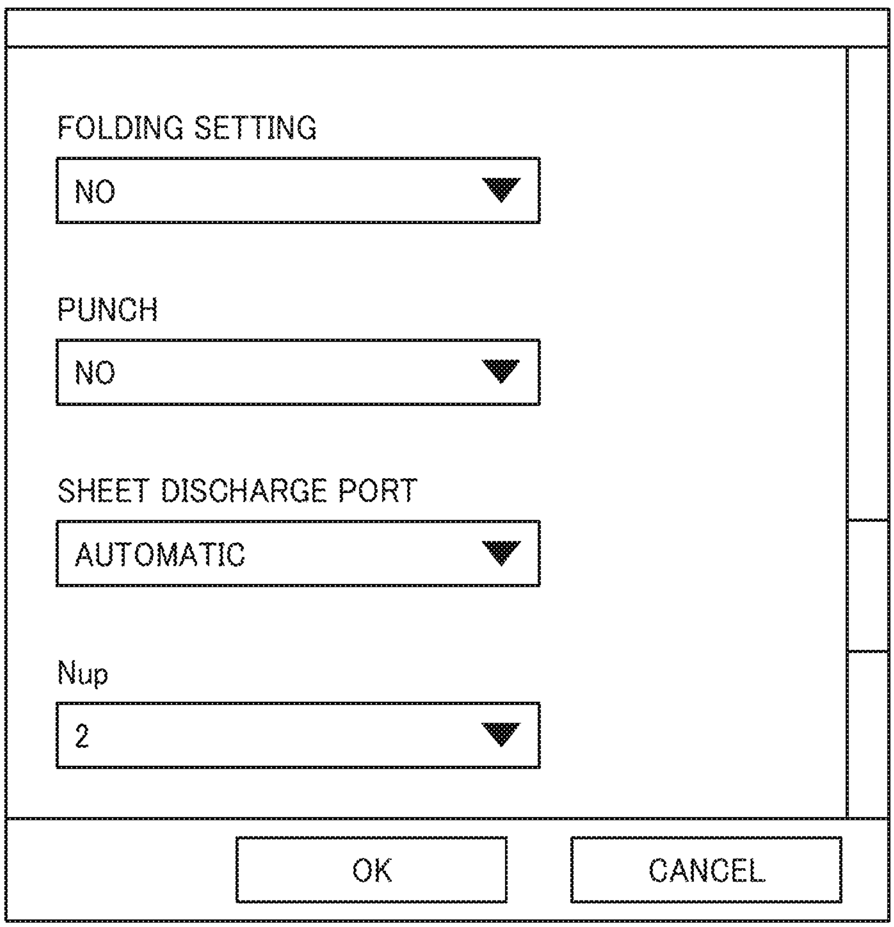

It should be noted that in the case that the print setting extension application 312 is not associated with the selected print queue, a standard print setting screen shown in FIG. 11A is displayed on the display unit 216. This standard print setting screen is a print setting screen that is set in advance in the OS 313. When the user presses a detailed setting button 1101 on the standard print setting screen, the screen switches to a detailed print screen shown in FIG. 11B. This detailed print screen is a screen for setting the setting items that cannot be displayed on the standard print setting screen. The detailed print screen can be scrolled by the user operating a scroll bar, and as shown in FIG. 11C and FIG. 11D, the user is able to perform the print settings for a plurality of setting items supported by the OS 313. Furthermore, when the user selects an OK button 1102 on the detailed print screen, the print settings, which have been set, are stored, and the screen on the display unit 216 returns to the standard print setting screen shown in FIG. 11A. An apply button 1103 on the standard print setting screen is a button for storing the print settings. A cancel button 1104 on the standard print setting screen is a button for returning to the print setting initial screen shown in FIG. 9 without storing the print settings. When the user selects an OK button 1105, the print settings are stored, and the screen returns to the print setting initial screen shown in FIG. 9. It should be noted that on the screens shown in FIG. 11A, FIG. 11B, FIG. 11C, and FIG. 11D, the printer vendor-independently-defined print setting items and the printer vendor-independently-defined attribute values cannot be set.

Figure 10A:
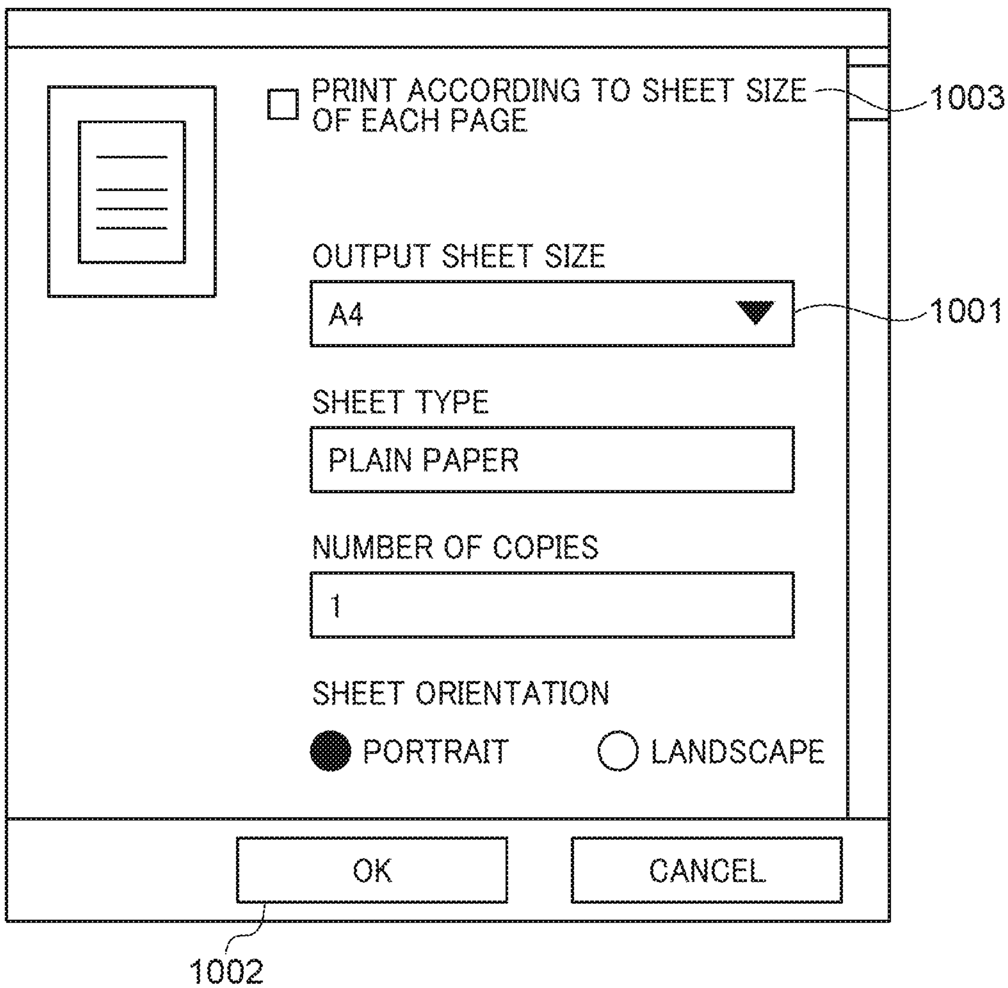
FIGS. 10A, 10B, 10C, 10D, 10E, and 10F are diagrams that show examples of an extended print setting screen that is displayed on the display unit shown in FIG. 2A.
Figure 10B:
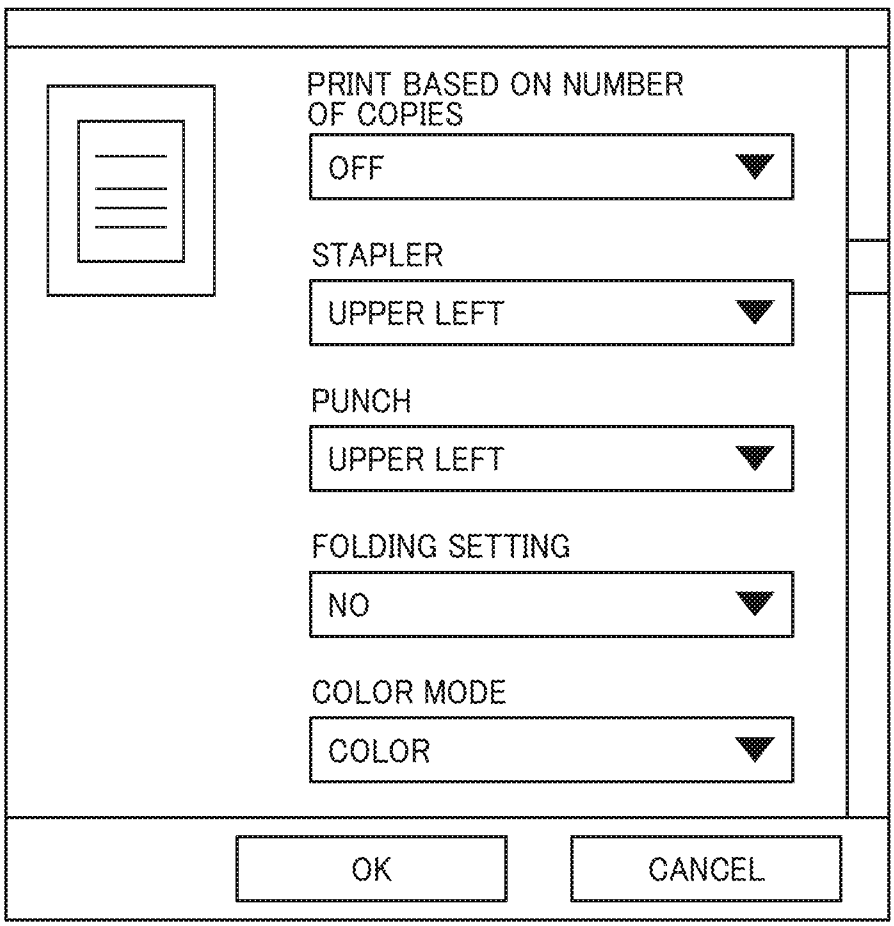
Figure 10C:
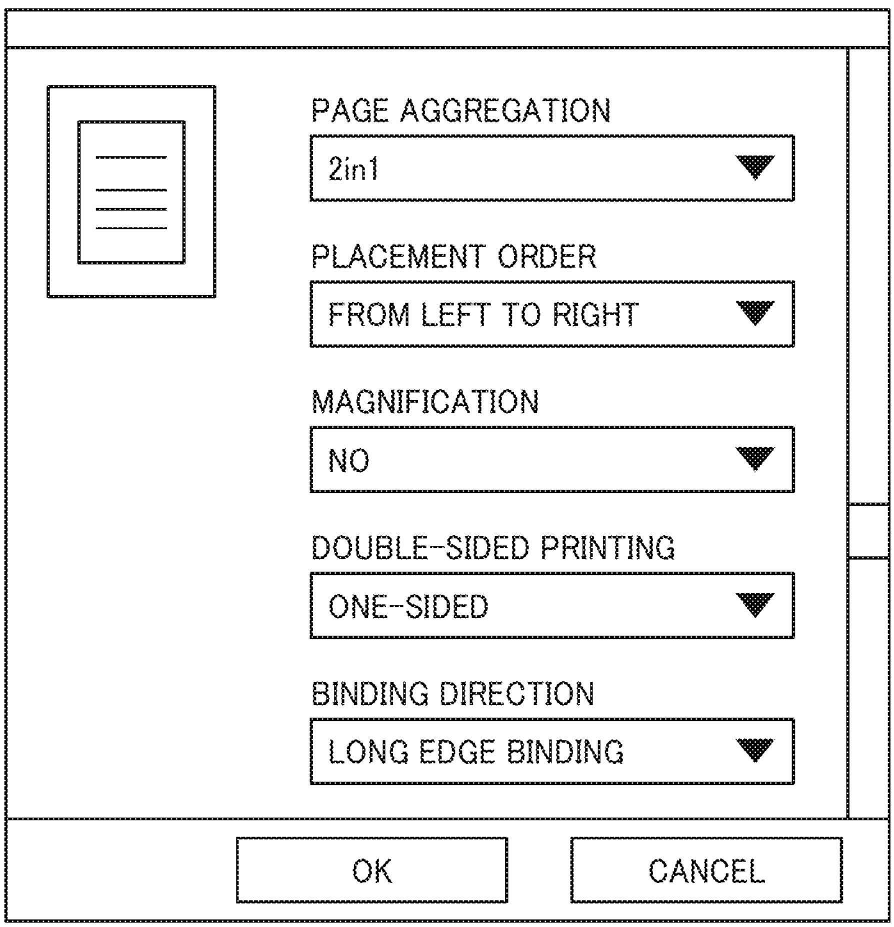
Figure 10D:
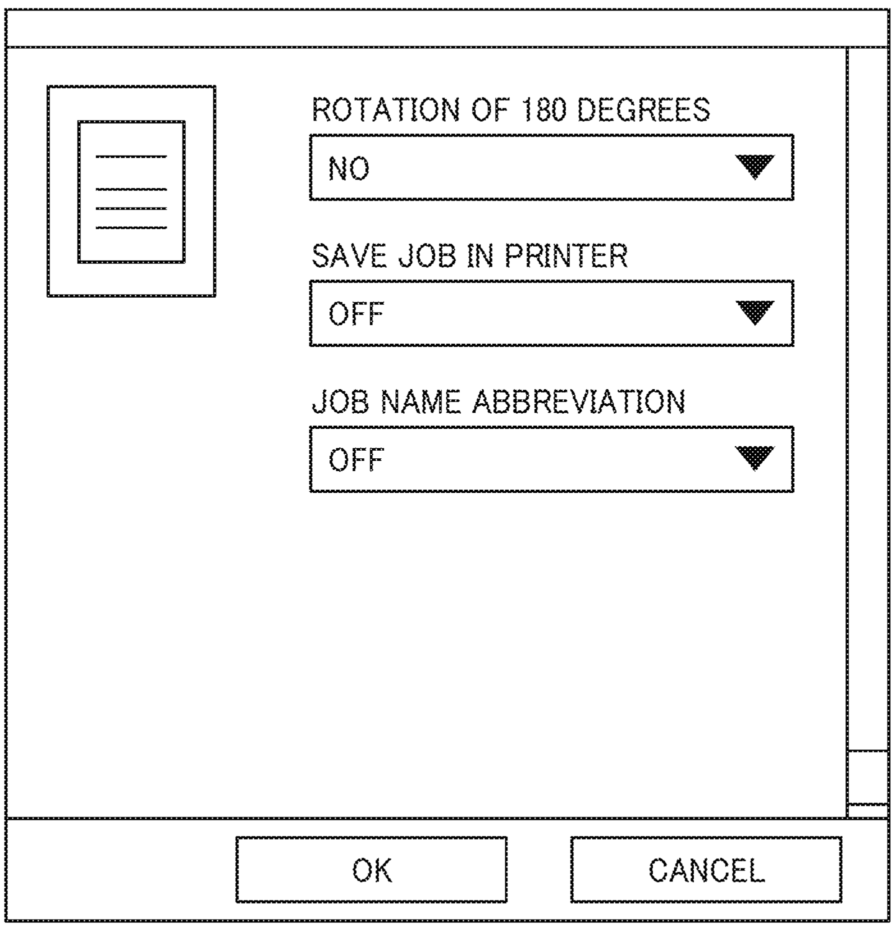
Figure 10E:
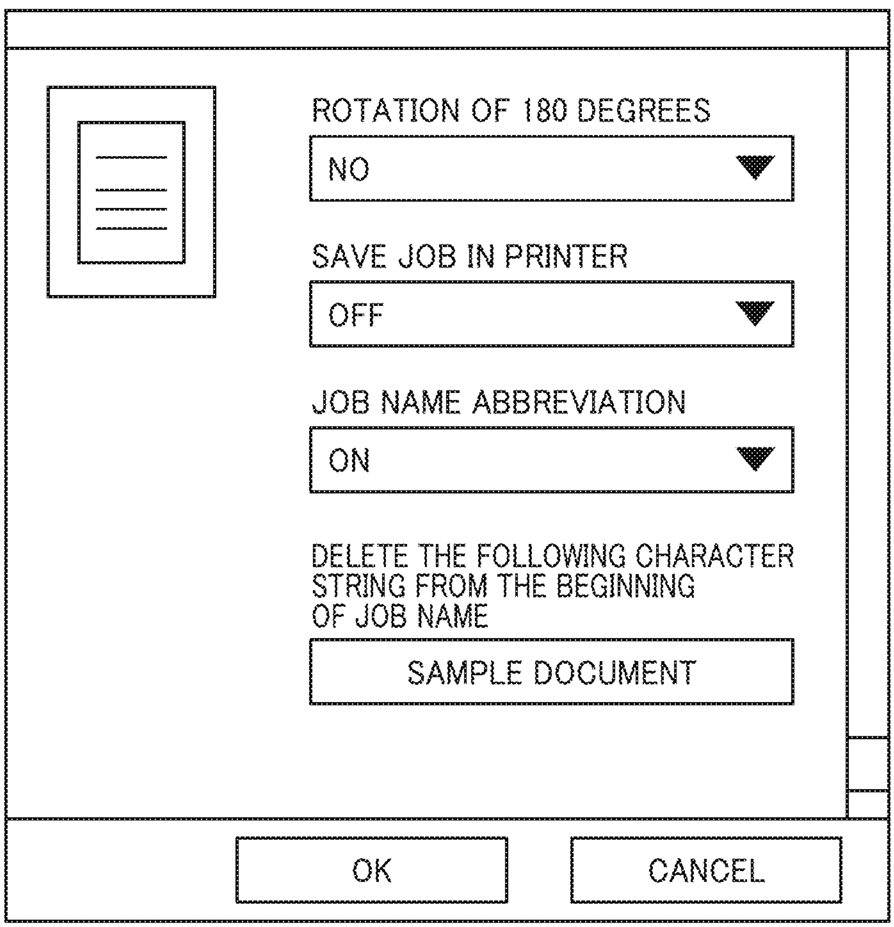

Returning to FIG. 8, the print setting extension application 312 started in the step S811 receives print setting information generated based on the print setting capability information generated based on the device capability information by the OS 313, and displays the extended print setting screen shown in FIG. 10A on the display unit 216. This extended print setting screen can be scrolled by the user operating the scroll bar as shown in FIG. 10A, FIG. 10B, FIG. 10C, FIG. 10D, FIG. 10E, and FIG. 10F to set the setting values of various print setting items.

Figure 10F:
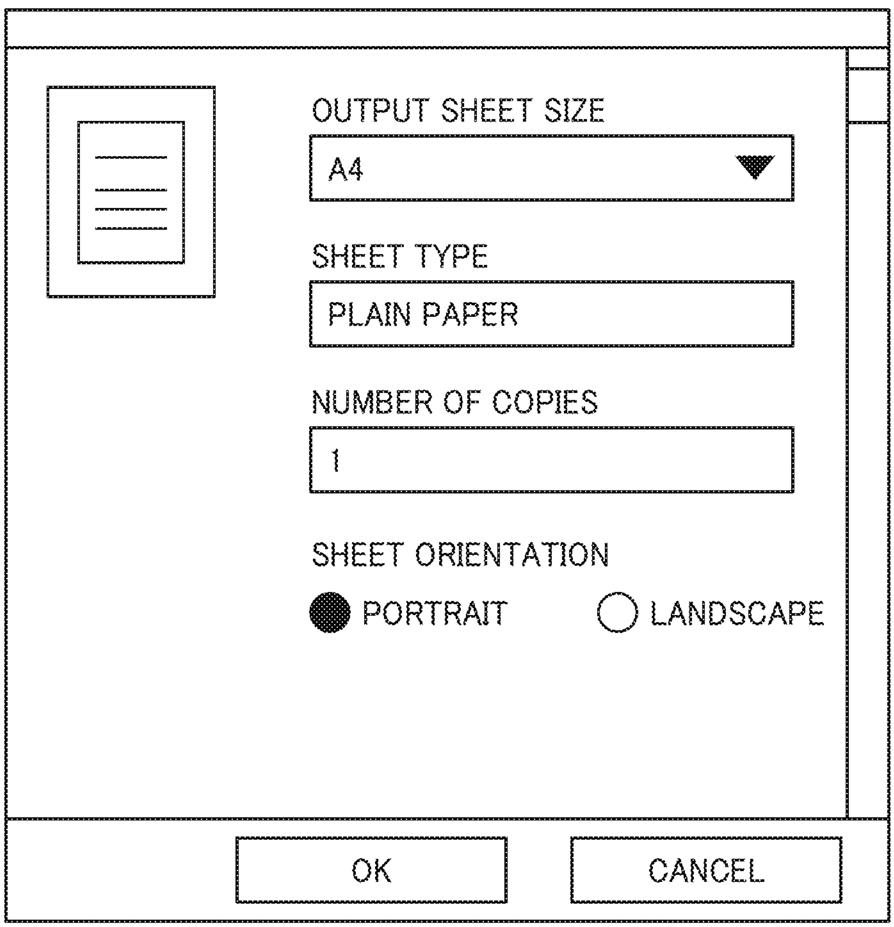

For example, an output sheet size of a setting item 1001 shown in FIG. 10A is the print setting information generated based on "psk: PageMediaSize" shown in FIG. 6E. Furthermore, "A4", which is an option of the output sheet size, is displayed based on the print setting information "psk: IOSA4". Likewise, "Print according to sheet size of each page" of a setting item 1003 shown in FIG. 10A is the print setting information generated based on "ns0000: MixedPageMediaPrinting" shown in FIG. 6F. Furthermore, information about whether or not to enable a setting is displayed so that it can be set in a checkbox based on the print setting information "ns0000: Off" and "ns0000: On". It should be noted that even in the case that the printer does not have the capability of the mixed-sheet printing, the setting item 1003 is displayed when the mixed-sheet printing is implemented by the print setting extension application 312 dividing a job and switching sheet settings for each job. For example, whether or not to display the setting item 1003 may be uniquely determined for each model as a setting which the print setting extension application 312 has, or may be set by the user. It should be noted that in the case that the printer does not have the capability of the mixed-sheet printing and the job is not divided by the print setting extension application 312, as shown in FIG. 10F, an extended print setting screen that does not have the setting item 1003 is displayed. Alternatively, an extended print setting screen, which is controlled so that the setting item 1003 is grayed out and cannot be operated, may be displayed.

As described above, the print setting extension application 312 is able to convert the device capability information including the printer vendor-specific setting items into the setting values and display the extended print setting screen. In addition, the print setting extension application 312 is also able to display the printer vendor-specific setting items on the extended print setting screen according to its own implementations. Thus, it is possible to set the setting items and the setting values, which cannot be set on the standard print setting screens shown in FIG. 11A, FIG. 11B, FIG. 11C, and FIG. 11D provided by the OS 313, on the extended print setting screen.

Figure 9:
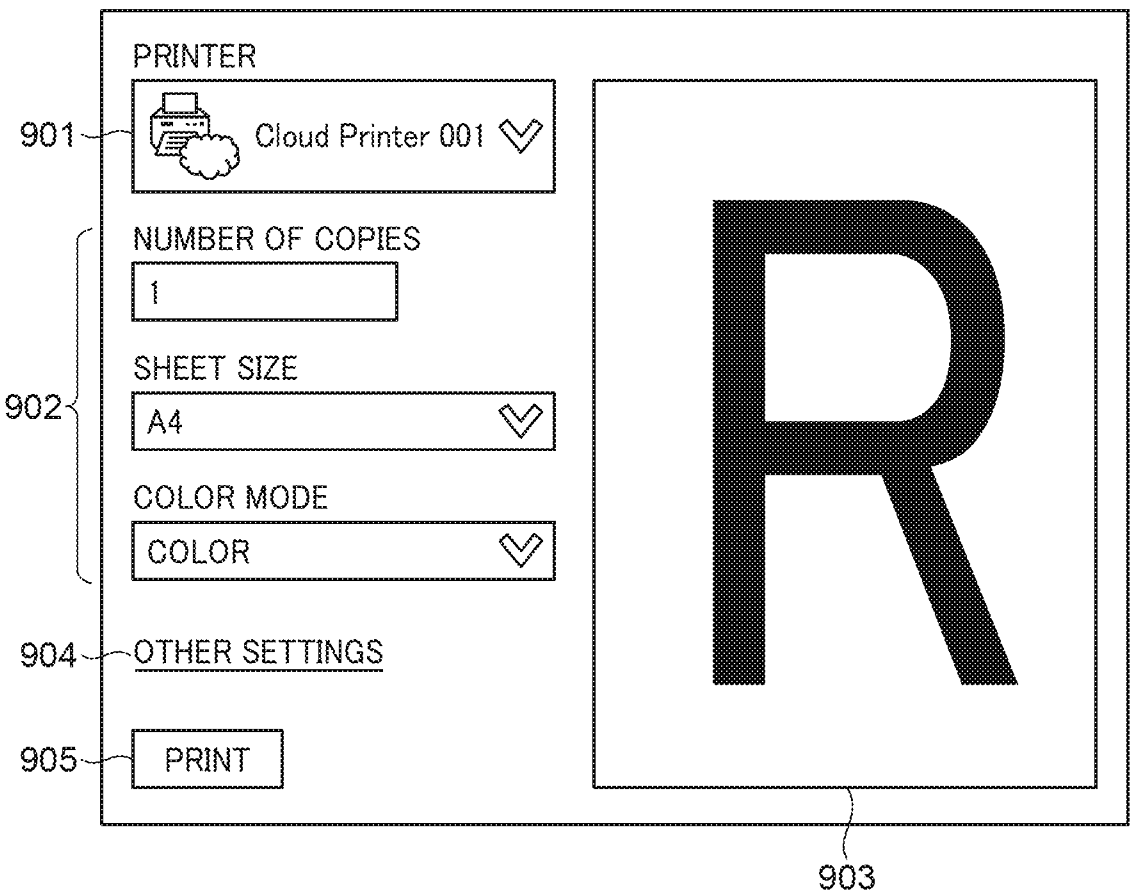
FIG. 9 is a diagram that shows an example of a print setting initial screen that is displayed on the display unit shown in FIG. 2A.

The user selects an object 1002 on the extended print setting screen. The object 1002 is an object for confirming the print settings. The print setting extension application 312 provides the function of allowing the user to arbitrarily change the print settings, and in the case that the print settings have been changed, stores their setting values. For example, it is assumed that the user has changed the output sheet size from "A4" to "Letter" on the extended print setting screen. In this case, the print setting information held by the print setting extension application 312 changes from "A4" to "Letter". When the object 1002 is selected, the print setting extension application 312 obtains the print setting information set on the extended print setting screen and passes the print setting information to the OS 313. After passing the print setting information to the OS 313, the print setting extension application 312 ends the display of the extended print setting screen (a step S812). When the process of the step S812 is completed, the print setting initial screen shown in FIG. 9 is displayed on the display unit 216. On the print setting initial screen, the setting values, which are set by the print setting extension application 312, are set.

When the user selects an object 905 on the print setting initial screen, the document generating application 315 gives a printing instruction to the OS 313 (a step S813). The OS 313 carries out a process related to printing based on the printing instruction received from the document generating application 315. Specifically, the OS 313 generates intermediate data, and passes the generated intermediate data and the print setting information edited on the print setting screen to the print setting extension application 312 (a step S814). The intermediate data is data that is generated before it is converted into the print data such as page description language (PDL), and is, for example, XML Paper Specification data (XPS data). The print setting information is also included in the intermediate data.

The print setting extension application 312 generates the print data based on the obtained intermediate data (a step S815). The print data means, for example, PDL such as a portable document format (PDF) file. In addition, the print setting extension application 312 generates the print capability information based on the obtained print setting information. Specifically, the print capability information is information in which the print setting information is described by the attribute values defined by the IPP.

The print setting extension application 312 passes the generated print data and the print capability information to the OS 313 (a step S816). The processes of the step 814 to the step S816 are processes carried out in the case that the print setting extension application 312 associated with the print queue has been installed in the client terminal 101.

In the case that the print setting extension application 312 has not been installed in the client terminal 312, the OS 313 of the client terminal 101 generates the XPS data and edits a page layout. In addition, the OS 313 converts the XPS data into a predetermined format to generate the print data and the print capability information. The predetermined format is, for example, PDF or PWG-Raster format.

The OS 313 transmits the print data and the print capability information passed from the print setting extension application 312 or the print data and the print capability information generated by the OS 313 to the cloud print service 321 (a step S818).

The cloud print service 321 transmits the print data and the print capability information received from the client terminal 101 to the cloud print compatible printer 104 (a step S819). It should be noted that although in the first embodiment of the present invention, when the cloud print service 321 has received the print data and the print capability information, the received print data and the received print capability information are transmitted to the cloud print compatible printer 104, this is not limitative. For example, the cloud print compatible printer 104 may regularly inquire of the cloud print service 321 to obtain unprinted print data and the print capability information corresponding to the unprinted print data.

By carrying out the processes shown in FIG. 8 described above, it is possible to transmit the print data that has reflected the print settings performed by using the print setting extension application 312 to the cloud print compatible printer 104 via the cloud print service 321.

Next, the processing that is carried out by the client terminal 101 will be described.

Figure 12:
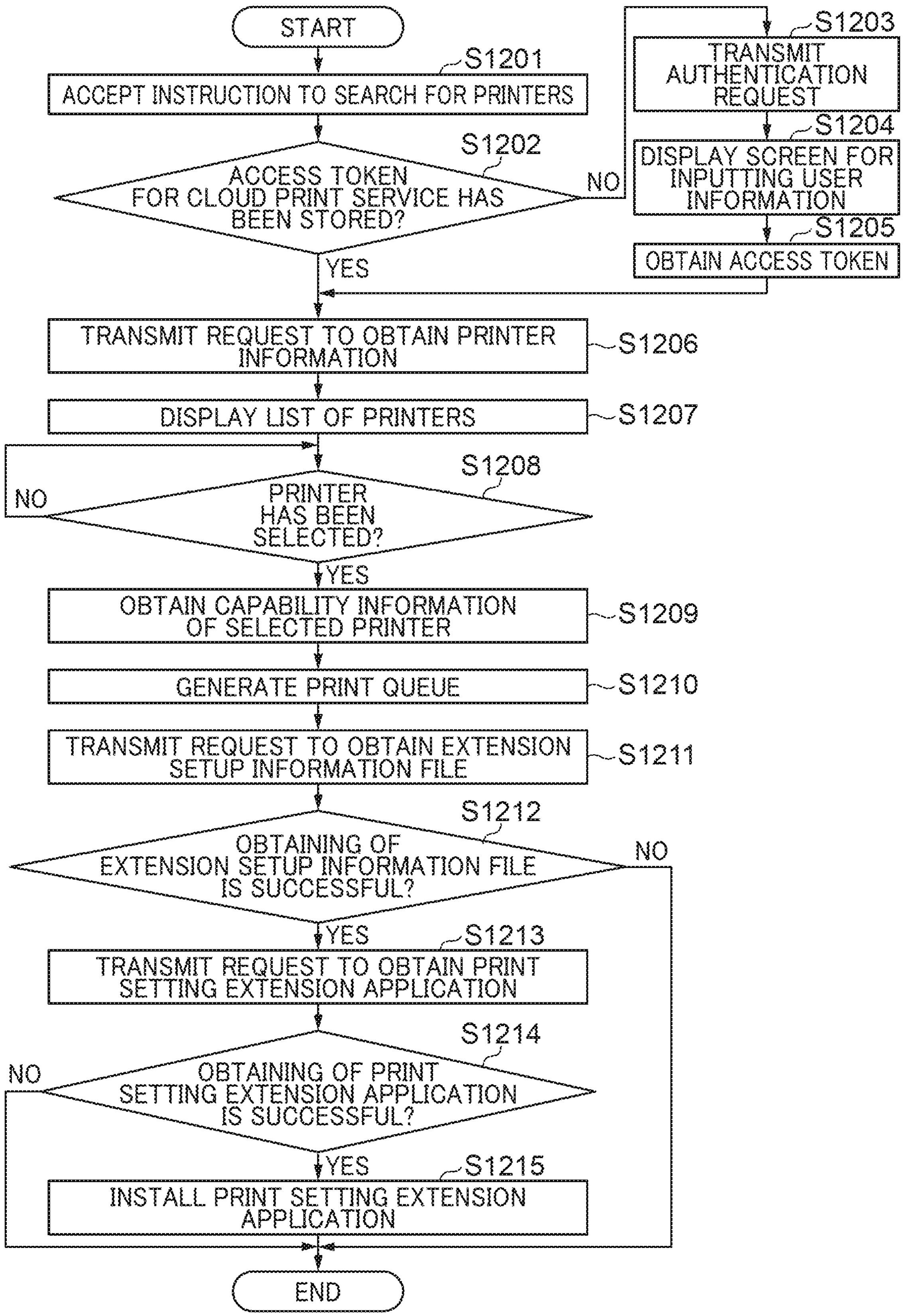
FIG. 12 is a flowchart that shows a procedure of a print setting extension application installation processing that is carried out by the client terminal shown in FIG. 1.

FIG. 12 is a flowchart that shows a procedure of a print setting extension application installation processing that is carried out by the client terminal 101 shown in FIG. 1. The print setting extension application installation processing corresponds to the process that is carried out by the OS 313 of the client terminal 101 in the above-described registration processing for the cloud print compatible printer 104 in FIG. 3. The print setting extension application installation processing is implemented by the CPU 212 executing a program stored in the storage unit 214 to control the OS 313. The print setting extension application installation processing is carried out when the object 501 on the printer setting screen shown in FIG. 5, which is displayed on the display unit 216 of the client terminal 101, is selected by the user.

As shown in FIG. 12, first, due to the user selecting the object 501, the CPU 212 accepts a printer search instruction (an instruction to search for printers) (a step S1201). Next, the CPU 212 determines whether or not the access token for the cloud print service 321 has been stored (a step S1202). The client terminal 101 stores the access token for obtaining information from the cloud print service 321 for each user who is allowed to log in to the client terminal 101. In the step S1202, for example, in the case that the access token associated with the user logged in to the client terminal 101 has been stored, it is determined that the access token for the cloud print service 321 has been stored. On the other hand, in the case that the access token associated with the user logged in to the client terminal 101 has not been stored, it is determined that the access token for the cloud print service 321 has not been stored.

In the case of being determined in the step S1202 that the access token for the cloud print service 321 has been stored, the print setting extension application installation processing proceeds to a step S1206, which will be described below.

In the case of being determined in the step S1202 that the access token for the cloud print service 321 has not been stored, the CPU 212 transmits an authentication request to the cloud print service 321 (a step S1203). Next, the CPU 212 receives a URL, which is used to display the screen for inputting the user information, from the cloud print service 321. As described above, the user information is the login name and the password. Next, the CPU 212 accesses the received URL, and displays the above screen on the display unit 216 (a step S1204).

The CPU 212 transmits the user information, which has been inputted into the above screen, to the cloud print service 321 (see, for example, the step S3003). The cloud print service 321 performs the user authentication by using the user information received from the client terminal 101, and when the user authentication is successful, the cloud print service 321 transmits the access token to the client terminal 101.

The CPU 212 obtains the access token from the cloud print service 321 (a step S1205) (see, for example, the step S3005). Next, the print setting extension application installation processing proceeds to the step S1206. It should be noted that in the case that the user authentication is unsuccessful, the cloud print service 321 notifies the client terminal 101 of an authentication error (see, for example, the step S3006). In the case of receiving this notification, the print setting extension application installation processing is ended (see, for example, the step S3007).

In the step S1206, the CPU 212 transmits a request to obtain the printer information, to which the stored access token or the access token obtained in the step S1205 has been attached, to the cloud print service 321 (see, for example, the step S3008). In response to the request to obtain the printer information (the obtaining request), the cloud print service 321 transmits the printer information to the client terminal 101 (see, for example, the step S3009). As described above, the printer information is the information indicating the printer that the user identified by the access token attached to the obtaining request is permitted to use. As described above, the printer information includes the printer name of the printer that the user is permitted to use and the HWID of the printer that the user is permitted to use.

Next, the CPU 212 displays a list of printers corresponding to the printer information obtained from the cloud print service 321 on the area 502 of the printer setting screen displayed on the display unit 216 (a step S1207).

Next, the CPU 212 determines whether or not the printer has been selected (a step S1208). The CPU 212 stands by until the printer is selected. When the printer is selected (YES in the step S1208), the CPU 212 transmits a request to obtain the capability information of the selected printer to the cloud print service 321 (a step S1209) (see, for example, the step S3010). Here, the CPU 212 inquires of the cloud print service 321 about the setting items registered in advance in the OS 313.

Next, based on the capability information obtained from the cloud print service 321, the CPU 212 updates the device capability information stored in the client terminal 101 and generates a print queue (a step S1210) (see, for example, the step S3012).

Next, the CPU 212 transmits a request to obtain the extension setup information file 700 to the online support service 351 (a step S1211) (see, for example, the step S3013). This obtaining request includes the HWID of the printer. Next, the CPU 212 determines whether or not obtaining of the extension setup information file 700 is successful (the extension setup information file 700 has been successfully obtained) (a step S1212). In the case of being determined in the step S1212 that obtaining of the extension setup information file 700 is unsuccessful (the extension setup information file 700 has not been successfully obtained), the print setting extension application installation processing is ended (see, for example, the step S3017).

In the case of being determined in the step S1212 that obtaining of the extension setup information file 700 is successful, the CPU 212 carries out the following processing. That is, the CPU 212 installs the extension setup information file 700, which has been obtained from the online support service 351, in association with the print queue generated in the step S1210 (see, for example, the step S3015). Next, the CPU 212 extracts an application ID from the extension setup information file 700 (see, for example, the step S3016). Next, the CPU 212 transmits a request to obtain the print setting extension application 312 corresponding to the extracted application ID to the application management service 331 (a step S1213) (see, for example, the step S3018).

Next, the CPU 212 determines whether or not obtaining of the print setting extension application 312 is successful (the print setting extension application 312 has been successfully obtained) (a step S1214). In the case of being determined in the step S1214 that obtaining of the print setting extension application 312 is unsuccessful (the print setting extension application 312 has not been successfully obtained), the print setting extension application installation processing is ended (see, for example, the step S3021).

In the case of being determined in the step S1214 that obtaining of the print setting extension application 312 is successful, the CPU 212 installs the obtained print setting extension application 312 (a step S1215) (see, for example, the step S3020). In addition, the CPU 212 registers an application ID of the print setting extension application 312 in association with the print queue. Furthermore, the CPU 212 makes an event registration indicating the timing of notification in the OS 313. Here, in the case that a print queue associated with the print setting extension application 312 has been selected on the print setting screen displayed by the document generating application 315, the registration is made so that the print setting extension application 312 is notified of an event. After that, the print setting extension application installation processing is ended.

Figure 13:
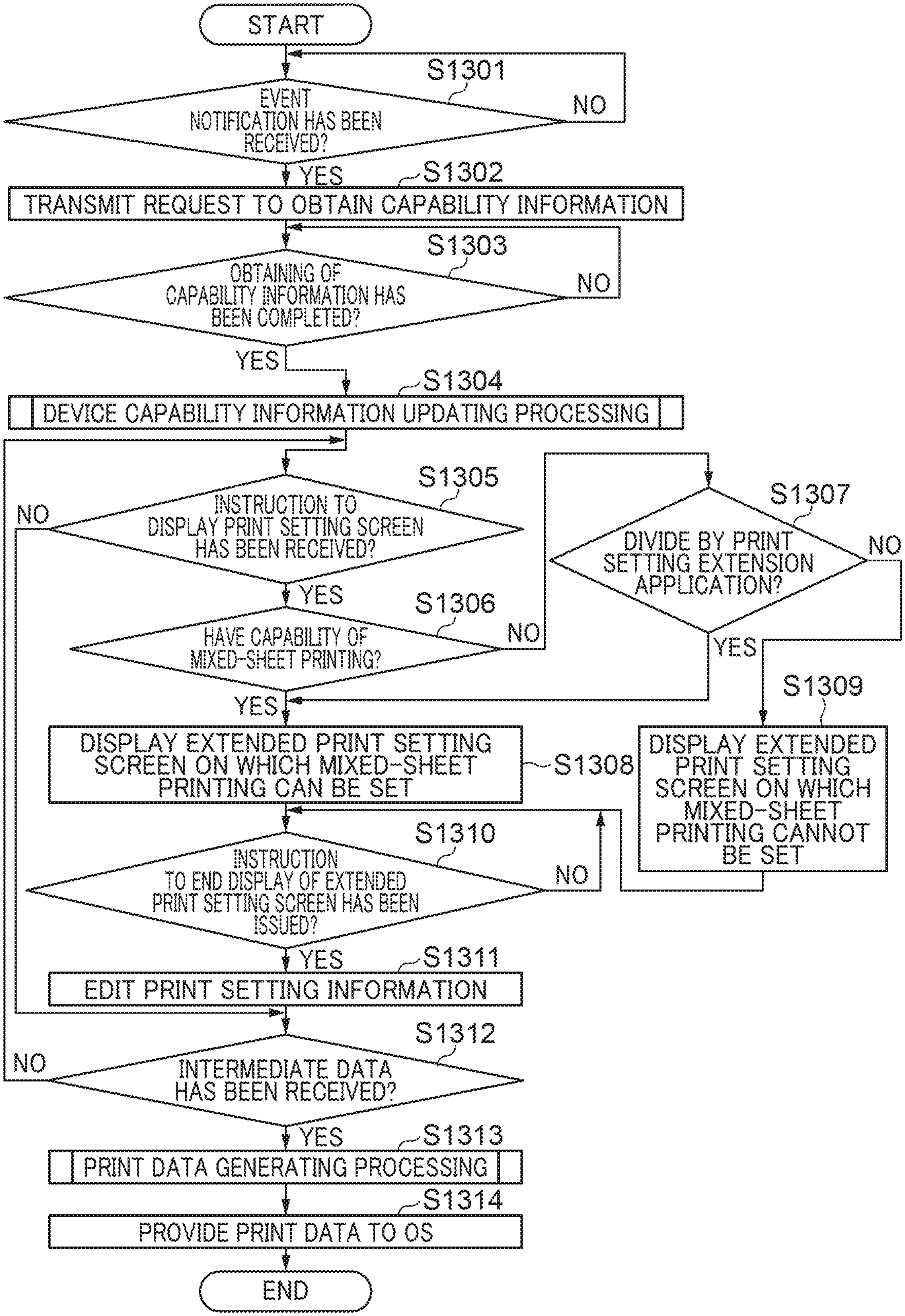
FIG. 13 is a flowchart that shows a procedure of a print control processing that is carried out by the client terminal shown in FIG. 1.

FIG. 13 is a flowchart that shows a procedure of a print control processing that is carried out by the client terminal 101 shown in FIG. 1. The print control processing shown in FIG. 13 corresponds to the process that is carried out by the print setting extension application 312 of the client terminal 101 in the above-described print data transmission control processing shown in FIG. 8. The print control processing is implemented by the CPU 212 loading a program stored in the print setting extension application 312 into the memory 213 and executing the loaded program to control the print setting extension application 312. The print control processing shown in FIG. 13 is carried out when the OS 313 provides the event notification in the step S805 described above. It should be noted that in the print control processing shown in FIG. 13, it is assumed that the print setting initial screen shown in FIG. 9 has already been displayed on the display unit 216. On the print setting initial screen, the object 904 is grayed out (is displayed in gray out).

As shown in FIG. 13, the CPU 212 determines whether or not the event notification (a notification of the event) has been received (a step S1301). The event means an event that is issued by the OS 313, and is an event for notifying the print setting extension application 312 that the timing registered in the step S1215 has occurred (it is the timing registered in the step S1215). The CPU 212 stands by until the event notification is received. When the event notification is received (YES in the step S1301), the CPU 212 transmits a request to obtain the capability information to the cloud print service 321 (a step S1302) (see, for example, the step S806). In the step S1302, the CPU 212 transmits the request to obtain the capability information of the setting items set in the print setting extension application 312 to the cloud print service 321. In the step S1302, the CPU 212 also obtains the capability information of the setting items not obtained in the step S1206 described above.

Next, the CPU 212 determines whether or not the obtainment of the capability information is completed (a step S1303). The CPU 212 stands by until the obtainment of the capability information is completed. When the obtainment of the capability information is completed (YES in the step S1303), the CPU 212 performs a device capability information updating processing (a processing to update the device capability information) by using the obtained capability information (a step S1304). As a result, the capability information of the setting items that are not obtained by the OS 313 is also stored in the client terminal 101. It should be noted that the details of the device capability information updating processing performed in the step S1304 will be described below with reference to FIG. 14.

Next, the CPU 212 enables an object that triggers the UI screen of the print setting extension application 312 to be displayed (see, for example, the step S810). As a result, the object 904 on the print setting initial screen shown in FIG. 9 displayed on the display unit 216 is no longer grayed out (the object 904 becomes able to be clicked), and the user becomes able to select the object 904.

Next, the CPU 212 determines whether or not an instruction to display the print setting screen by the print setting extension application 312 has been accepted (a step S1305). The instruction to display the print setting screen by the print setting extension application 312 is, for example, an instruction that is issued based on a user operation such as the selection of the object 904.

In the case of being determined in the step S1305 that the instruction to display the print setting screen by the print setting extension application 312 has not been accepted, the print control processing proceeds to a step S1312, which will be described below.

In the case of being determined in the step S1305 that the instruction to display the print setting screen by the print setting extension application 312 has been accepted, the print control processing proceeds to a step S1306, which will be described below. In the step S1306, based on the device capability information updated in the step S1304, the CPU 212 determines whether or not the printer which becomes a transmission destination of the print data (the printer to which the print data will be transmitted) has the capability of the mixed-sheet printing (the step S1306). For example, in the case that the device capability information updated in the step S1304 includes a description of the mixed-sheet printing (for example, "ns0000: MixedPageMediaPrinting"), it is determined that the printer which becomes the transmission destination of the print data has the capability of the mixed-sheet printing. In this case, the print control processing proceeds to a step S1308, which will be described below.

On the other hand, in the case that the device capability information updated in the step S1304 does not include the description of the mixed-sheet printing, it is determined in the step S1306 that the printer which becomes the transmission destination of the print data does not have the capability of the mixed-sheet printing. In this case, the print control processing proceeds to a step S1307.

In the step S1307, the CPU 212 determines whether or not to implement the mixed-sheet printing by causing the print setting extension application 312 to divide a job. For example, in the step S1307, in the case that a predetermined setting for causing to display the setting item 1003 for performing setting of the mixed-sheet printing has been made, it is determined that the mixed-sheet printing will be implemented by causing the print setting extension application 312 to divide the job. In this case, the print control processing proceeds to the step S1308. In the step S1308, based on the device capability information, the CPU 212 causes the display unit 216 to display an extended print setting screen on which the setting of the mixed-sheet printing can be performed. The extended print setting screen on which the setting of the mixed-sheet printing can be performed is, for example, the extended print setting screen shown in FIG. 10A, which includes the setting item 1003. The CPU 212 accepts a user operation that selects the setting values via the displayed extended print setting screen. After that, the print control processing proceeds to a step S1310, which will be described below.

On the other hand, in the step S1307, in the case that the predetermined setting for causing to display the setting item 1003 for performing setting of the mixed-sheet printing has not been made, it is determined that the mixed-sheet printing will not be implemented by causing the print setting extension application 312 to divide the job. In this case, the print control processing proceeds to a step S1309. In the step S1309, based on the device capability information, the CPU 212 causes the display unit 216 to display an extended print setting screen on which the setting of the mixed-sheet printing cannot be performed. The extended print setting screen on which the setting of the mixed-sheet printing cannot be performed is, for example, the extended print setting screen shown in FIG. 10F, which does not include the setting item 1003. The CPU 212 accepts a user operation that selects the setting values via the displayed extended print setting screen.

Next, the CPU 212 determines whether or not an instruction to end the display of the extended print setting screen has been issued (a step S1310). The CPU 212 stands by until the instruction to end the display of the extended print setting screen is issued. When the instruction to end the display of the extended print setting screen is issued (YES in the step S1310), the CPU 212 edits the print setting information by using the setting values set on the extended print setting screen displayed on the display unit 216 (a step S1311). For example, in the case that a checkbox of the setting item 1003 on the extended print setting screen shown in FIG. 10A displayed on the display unit 216 in the step S1308 is marked, information indicating the mixed-sheet printing is included in the print setting information. In the case that the checkbox of the setting item 1003 is not marked, or in the case that the extended print setting screen shown in FIG. 10F is displayed in the step S1309, the information indicating the mixed-sheet printing is not included in the print setting information. Next, the CPU 212 ends the display of the extended print setting screen.

Next, the CPU 212 determines whether or not the print setting extension application 312 has received the intermediate data from the OS 313 (a step S1312).

In the case of being determined in the step S1312 that the print setting extension application 312 has not received the intermediate data from the OS 313, the print control processing returns to the step S1305. On the other hand, in the case of being determined in the step S1312 that the print setting extension application 312 has received the intermediate data from the OS 313, the CPU 212 carries out a print data generating processing based on the intermediate data received by the print setting extension application 312 (a step S1313). It should be noted that the details of the print data generating processing performed in the step S1313 will be described with reference to FIG. 15.

In addition, based on the print setting information received by the print setting extension application 312, the CPU 212 generates the print capability information described with the attribute values defined by the IPP. In the print capability information, in addition to the attribute values defined by the IPP, other attribute values can also be freely described. Therefore, the printer vendor-independently-defined setting items and the printer vendor-independently-defined attribute values can also be described in the print capability information.

Next, the CPU 212 provides the generated print data and the generated print capability information to the OS 313 (a step S1314). The OS 313 transmits the print data and the print capability information, which has been received via the print queue, to the cloud print service 321. After that, the print control processing is ended.

Figure 14:
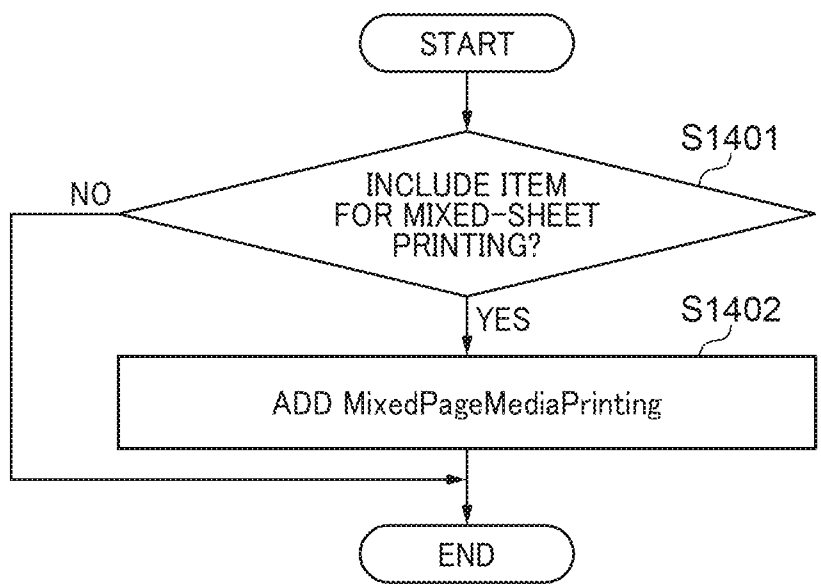
FIG. 14 is a flowchart that shows a procedure of a device capability information updating processing performed in a step S1304 of FIG. 13.

FIG. 14 is a flowchart that shows a procedure of the device capability information updating processing performed in the step S1304 of FIG. 13.

As shown in FIG. 14, the CPU 212 determines whether or not the capability information obtained in the step S1302 includes an item for the mixed-sheet printing (a step S1401).

In the case of being determined in the step S1401 that the capability information obtained in the step S1302 does not include the item for the mixed-sheet printing, the device capability information updating processing is ended.

On the other hand, in the case of being determined in the step S1401 that the capability information obtained in the step S1302 includes the item for the mixed-sheet printing, the CPU 212 adds a description regarding the mixed-sheet printing to the device capability information (a step S1402). Specifically, the CPU 212 adds "ns0000: MixedPageMediaPrinting" indicating whether or not to perform the mixed-sheet printing, and "ns0000: Off" and "ns0000: On" that are its "Option", which are shown in 603 of FIG. 6F, to the device capability information. After that, the device capability information updating processing is ended.

Figure 15:
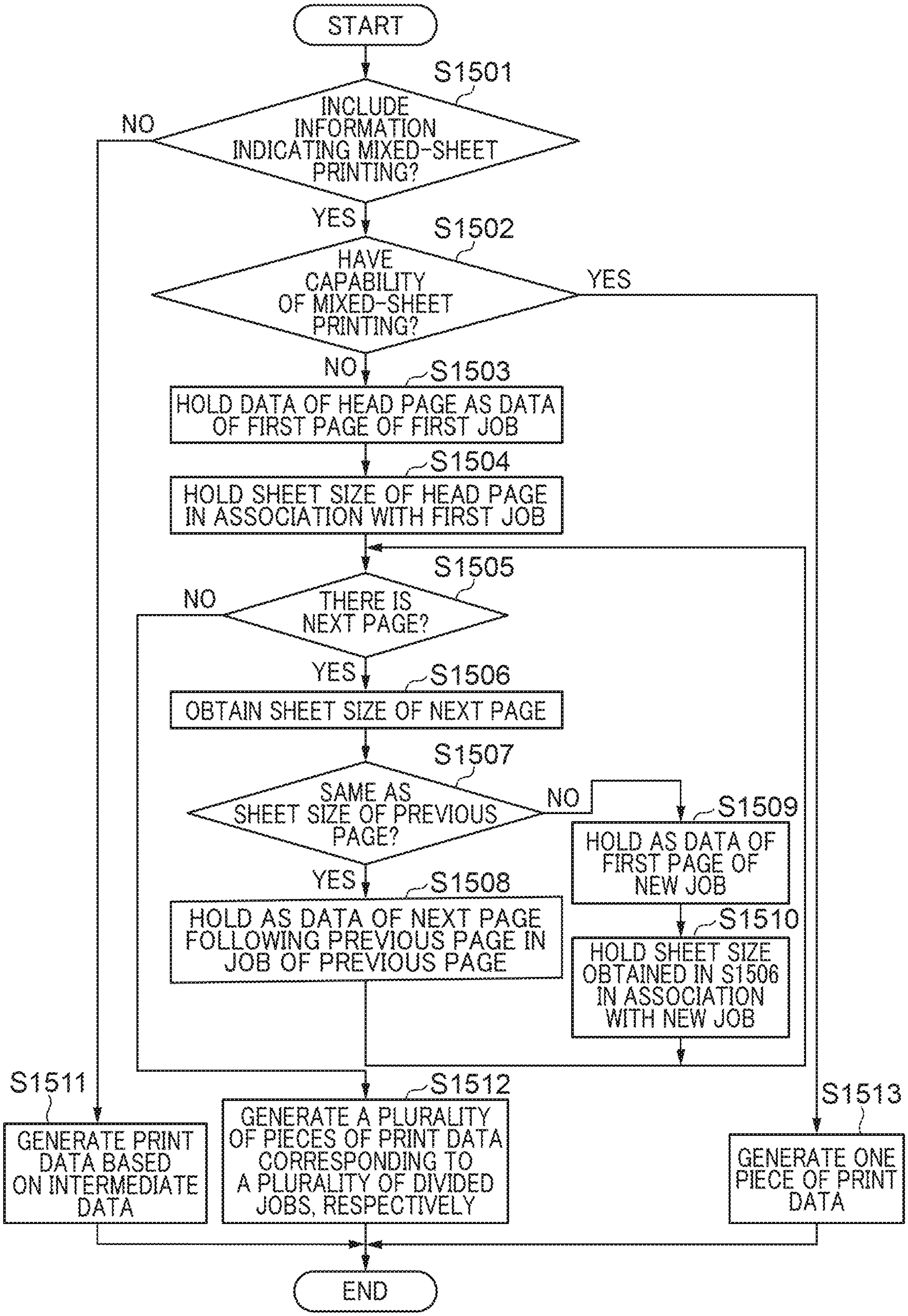
FIG. 15 is a flowchart that shows a procedure of a print data generating processing performed in a step S1313 of FIG. 13.

FIG. 15 is a flowchart that shows a procedure of the print data generating processing performed in the step S1313 of FIG. 13.

As shown in FIG. 15, the CPU 212 determines whether or not the information indicating the mixed-sheet printing is included in the print setting information of the intermediate data obtained from the OS 313 (a step S1501).

In the case of being determined in the step S1501 that the information indicating the mixed-sheet printing is not included in the print setting information of the intermediate data obtained from the OS 313, the CPU 212 generates the print data based on the intermediate data obtained from the OS 313 (a step S1511). After that, the print data generating processing is ended.

On the other hand, in the case of being determined in the step S1501 that the information indicating the mixed-sheet printing is included in the print setting information of the intermediate data obtained from the OS 313, the print data generating processing proceeds to a step S1502. In the step S1502, based on the device capability information updated in the step S1304, the CPU 212 determines whether or not the printer which becomes the transmission destination of the print data has the capability of the mixed-sheet printing. The method of determination used in the step S1502 is the same as the method of determination used in the step S1306.

In the case of being determined in the step S1502 that the printer which becomes the transmission destination of the print data does not have the capability of the mixed-sheet printing, the print data generating processing proceeds to a step S1503. In the step S1503, the CPU 212 holds data of a head page of the intermediate data obtained from the OS 313 in the storage unit 214 as data of a first page of a first job. The processes from the step S1503 to a step S1510 which will be described below, are processes for generating print data that enables the printer, which does not have the capability of the mixed-sheet printing, to implement the mixed-sheet printing.

Next, the CPU 212 holds a sheet size of the head page of the intermediate data obtained from the OS 313 in the storage unit 214 in association with the first job (a step S1504). Next, the CPU 212 refers to the intermediate data obtained from the OS 313, and determines whether or not there is a next page according to a print order of pages (a step S1505).

In the case of being determined in the step S1505 that there is the next page, the CPU 212 obtains a sheet size of the next page from the intermediate data obtained from the OS 313 (a step S1506). Next, the CPU 212 determines whether or not the sheet size obtained in the step S1506 is the same as a sheet size of a previous page (a step S1507).

In the case of being determined in the step S1507 that the sheet size obtained in the step S1506 is the same as the sheet size of the previous page, the print data generating processing proceeds to a step S1508. In the step S1508, the CPU 212 holds, in the storage unit 214, data of the page of the intermediate data obtained from the OS 313 whose sheet size has been obtained in the step S1506 as data of the next page following the previous page in the job of the previous page of the page. After that, the print data generating processing returns to the step S1505.

On the other hand, in the case of being determined in the step S1507 that the sheet size obtained in the step S1506 is not the same as the sheet size of the previous page, the print data generating processing proceeds to a step S1509. In the step S1509, the CPU 212 holds, in the storage unit 214, the data of the page of the intermediate data obtained from the OS 313 whose sheet size has been obtained in the step S1506 as data of a first page in a new job different from the job of the previous page of the page. Next, the CPU 212 holds the sheet size obtained in the step S1506 in the storage unit 214 in association with the new job (for example, a second job) (a step S1510). After that, the print data generating processing returns to the step S1505. In this way, in the first embodiment of the present invention, the processing, in which the job is divided based on the sheet size, is performed.

Figure 16A:
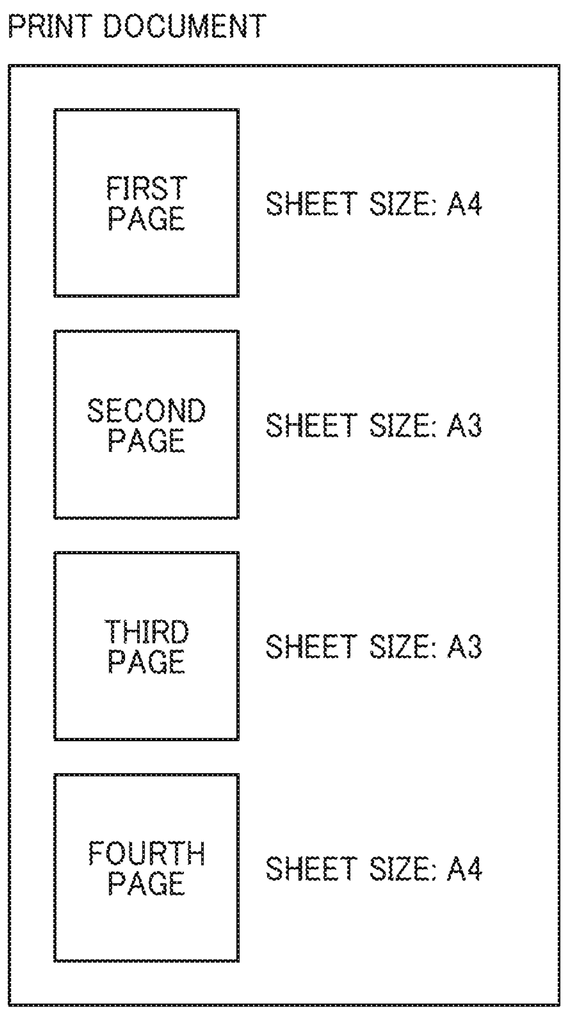
FIGS. 16A, 16B, and 16C are diagrams for explaining how intermediate data is generated by processing performed from steps S1503 to S1510 of FIG. 15.

Here, an example of the intermediate data generated by the processes from the step S1503 to the step S1510 will be described by using FIGS. 16A, 16B, and 16C. For example, as shown in FIG. 16A, it is assumed that sheet sizes of a first page and a fourth page of a print document are A4 size and sheet sizes of a second page and a third page of the print document are A3 size. Furthermore, it is assumed that FIG. 16B shows intermediate data that has been generated based on this print document and has been obtained from the OS 313 by the print setting extension application 312.

Figure 16B:
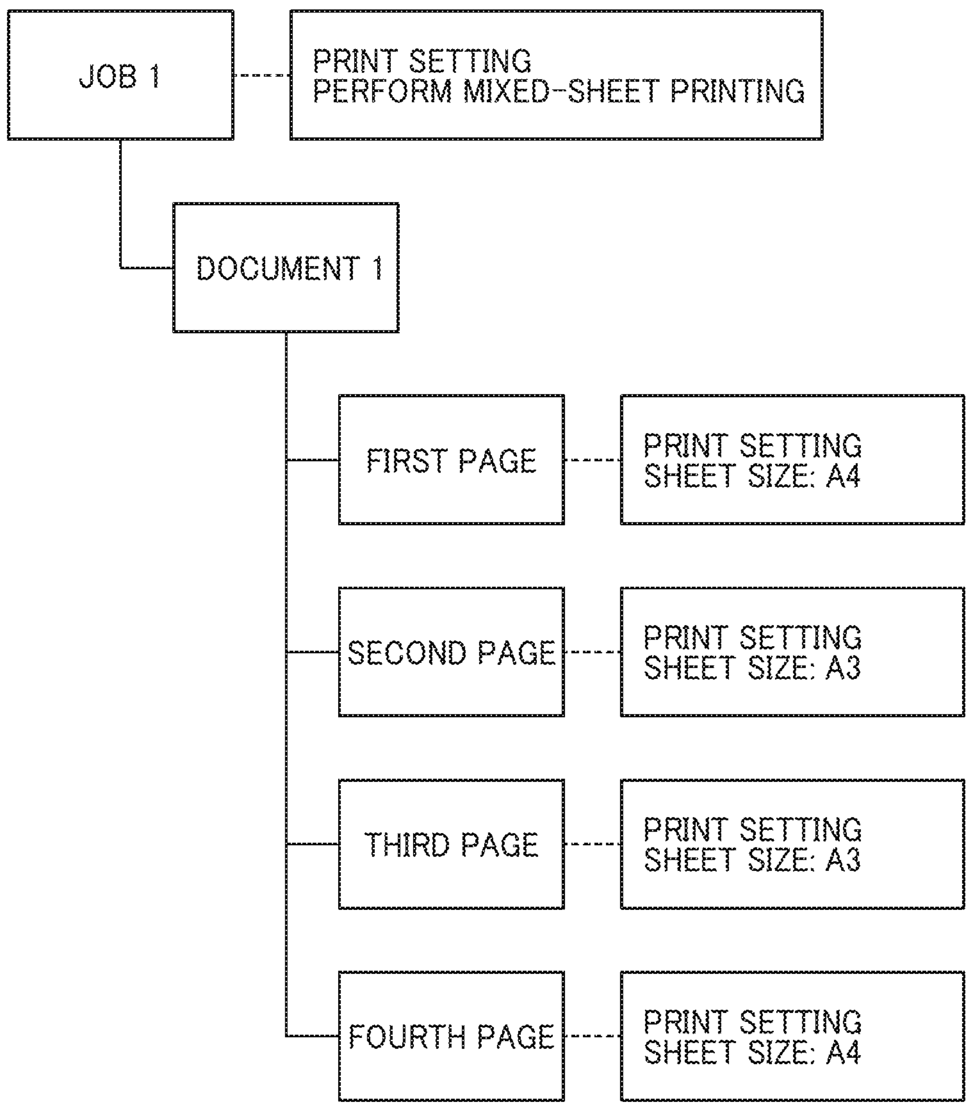
Figure 16C:
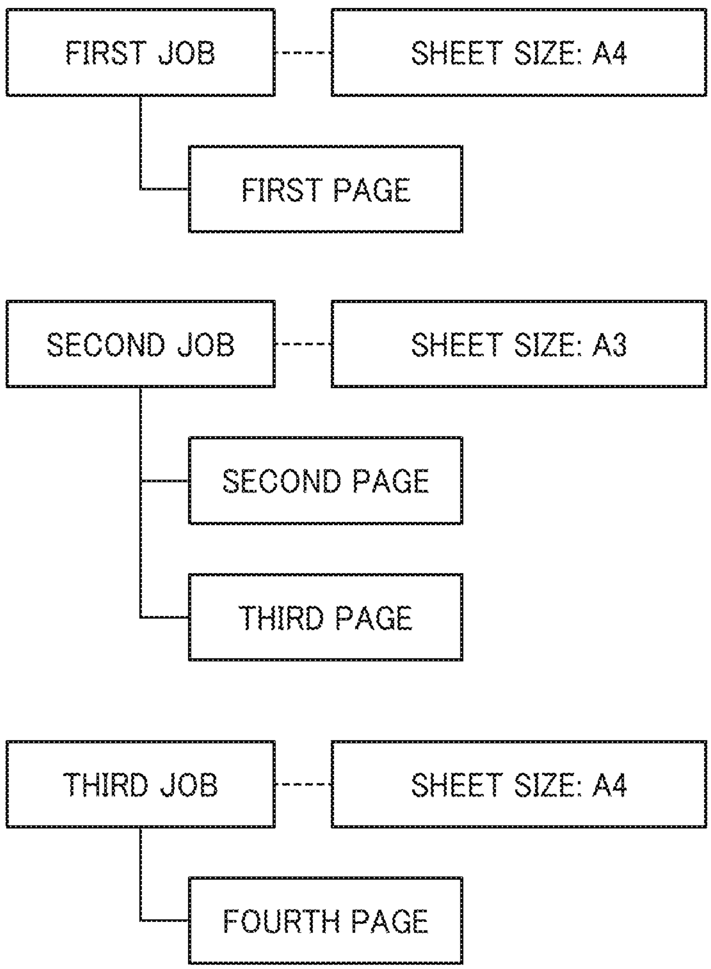

In the intermediate data shown in FIG. 16B, the information indicating the mixed-sheet printing is set as the print setting of the job, and the sheet size of each page is set as the print setting of each page. When the processes from the step S1503 to the step S1510 are performed with respect to the intermediate data shown in FIG. 16B, as shown in FIG. 16C, a plurality of pieces of divided intermediate data obtained by dividing the intermediate data based on differences among the sheet sizes of the respective pages is held in the storage unit 214. The divided intermediate data includes data corresponding to each page. That is, the job (the print document) is divided into three jobs (a first job, a second job, and a third job, i.e., a plurality of divided jobs) based on the sheet size from a head page of the print document, the first page of the print document is included in the first job, the second page and the third page of the print document are included in the second job, and the fourth page of the print document is included in the third job. Furthermore, the first job and the third job are held in association with the sheet size “A4”, respectively, and the second job is held in association with the sheet size “A3”. It should be noted that FIG. 16C is a schematic diagram, and the data format to be held may be the same data format as the received intermediate data or may be a different data format.

In the case of being determined in the step S1505 that there is no next page, the CPU 212 generates a plurality of pieces of print data corresponding to the plurality of divided jobs, respectively. Specifically, based on the plurality of pieces of divided intermediate data held in the storage unit 214, the CPU 212 generates the plurality of pieces of print data corresponding to each divided job. At this time, the sheet size associated with each divided job is set as the sheet size of the print setting of each divided job. After that, the print data generating processing is ended.

In the case of being determined in the step S1502 that the printer which becomes the transmission destination of the print data has the capability of the mixed-sheet printing, the print data generating processing proceeds to a step S1513. In the step S1503, based on the intermediate data obtained from the OS 313, the CPU 212 generates one piece of print data for performing the mixed-sheet printing. After that, the print data generating processing is ended. The one piece of print data includes the information indicating the mixed-sheet printing as the print setting. Furthermore, it is assumed that the one piece of print data is in a format such as PDF that has a sheet size for each page, and each page has a set sheet size. In the case that the information indicating the mixed-sheet printing is included in the obtained print data, the cloud print compatible printer 104 interprets the setting of the sheet size of each page in the print data and prints based on the sheet size of each page. As a result, the mixed-sheet printing is implemented.

According to the first embodiment described above, in the case that the printer which becomes the transmission destination of the print data does not have the capability of the mixed-sheet printing, the sheet sizes included in the intermediate data are obtained in order of pages to be printed, and based on the plurality of pieces of divided intermediate data obtained by dividing the intermediate data based on differences among the sheet sizes of the respective pages, the plurality of pieces of print data is generated. As a result, it is possible to implement the mixed-sheet printing in which the sheet size (a sheet size setting, i.e., a setting as to the sheet size) is different among the pages.

Moreover, in the first embodiment described above, in the case that the printer which becomes the transmission destination of the print data has the capability of the mixed-sheet printing, one piece of print data is generated in which the sheet size is set for each page. As a result, the printer equipped with the capability of the mixed-sheet printing can perform the mixed-sheet printing as one job without dividing the job. As a result, it is possible to prevent a print history from being divided into multiple parts and to prevent another job from being executed in between the divided jobs, which may occur when the job is divided.

Furthermore, in the first embodiment described above, in the case that the printer which becomes the transmission destination of the print data has the capability of the mixed-sheet printing, the extended print setting screen including the setting item 1003 is displayed on the display unit 216. As a result, in the case that the printer which becomes the transmission destination of the print data has the capability of the mixed-sheet printing, it is possible to accept an instruction to execute the mixed-sheet printing.

In addition, in the first embodiment described above, in the case that the printer which becomes the transmission destination of the print data does not have the capability of the mixed-sheet printing and the predetermined setting for causing to display the setting item 1003 has been made, the extended print setting screen including the setting item 1003 is displayed on the display unit 216. As a result, even in the case that the printer which becomes the transmission destination of the print data does not have the capability of the mixed-sheet printing, it is possible to accept the instruction to execute the mixed-sheet printing.

It should be noted that although in the first embodiment described above, data of the divided job (i.e., the divided intermediate data) and the sheet size associated with the divided job are held in the storage unit 214, these data may be held in a storage means other than the storage unit 214, for example, the memory 213.

Moreover, although in the first embodiment described above, as an example of the mixed-sheet printing, the case that the sheet sizes are mixed within the print document has been described, the mixed-sheet printing may be used for printing in which the setting such as a sheet orientation setting (a setting as to a sheet orientation), a page aggregation setting (a setting as to page aggregation), or a one-sided printing/double-sided printing setting (a setting as to whether to perform one-sided printing or double-sided printing, i.e., a setting indicating one of one-sided printing and double-sided printing) is different among pages instead of the sheet size setting. It should be noted that the page aggregation means printing multiple pages on one sheet. For example, as for the sheet orientation, there are cases where a document has mixed portrait and landscape pages. In the mixed-sheet printing performed with respect to the document having mixed portrait and landscape pages, in the print data generating processing shown in FIG. 15, the processing based on the sheet size just needs to be replaced with the processing based on the sheet orientation. Moreover, in the case that the information indicating the mixed-sheet printing is included in the print data, the cloud print compatible printer 104 just needs to interpret the sheet orientation set for each page in the print data and perform printing according to the interpreted sheet orientation.

Next, a second embodiment of the present invention will be described. The second embodiment is basically the same as the first embodiment in terms of configurations and operations, and differs from the first embodiment described above in that the printer having the capability of the mixed-sheet printing is configured to be able to interpret print data that includes print settings of a plurality of documents, switch the print setting for each document, and execute printing. Therefore, the configurations and operations that are the same as those in the first embodiment will not be described, only the configurations and operations that differ from those of the first embodiment will be described below. As print data that will be transmitted to such a printer, the client terminal 101 generates print data that includes print settings of a plurality of documents designated by the user and includes the print setting differing for each document.

Figure 17:
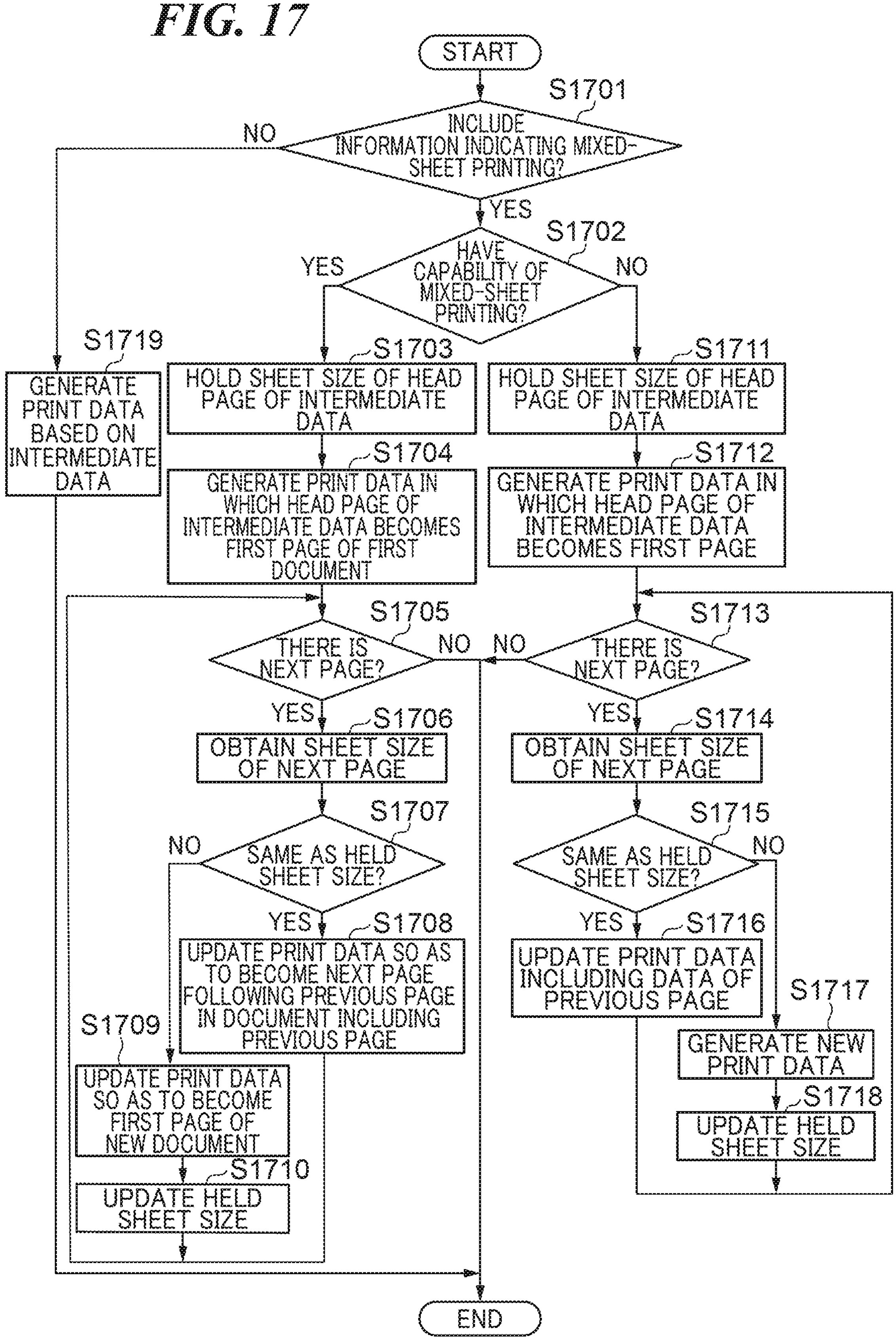
FIG. 17 is a flowchart that shows another procedure of the print data generating processing performed in the step S1313 of FIG. 13.

FIG. 17 is a flowchart that shows another procedure of the print data generating processing performed in the step S1313 of FIG. 13. The print data generating processing shown in FIG. 17 is similar to the print data generating processing shown in FIG. 15, and in particular, features that are different from those of the print data generating processing shown in FIG. 15 will be described below. The print data generating processing shown in FIG. 17 is also implemented by the CPU 212 loading a program stored in the print setting extension application 312 into the memory 213 and executing the loaded program to control the print setting extension application 312.

As shown in FIG. 17, the CPU 212 performs the process of a step S1701 that is the same as the process of the step S1501 described above. In the step S1701, in the case that the information indicating the mixed-sheet printing is included in the above print setting information, the CPU 212 performs the process of a step S1702 that is the same as the process of the step S1502 described above.

In the case of being determined in the step S1702 that the printer which becomes the transmission destination of the print data has the capability of the mixed-sheet printing, the CPU 212 obtains a sheet size of a head page from intermediate data obtained from the OS 313. The CPU 212 holds the obtained sheet size in the memory 213 (a step S1703).

Next, the CPU 212 generates print data in which the head page in the intermediate data obtained from the OS 313 becomes a first page of a first document (a step S1704). In the step S1704, the CPU 212 sets the sheet size obtained in the step S1703 as a sheet size of the first document. The CPU 212 holds the generated print data in the storage unit 214. Next, the CPU 212 refers to the intermediate data obtained from the OS 313, and determines whether or not there is a next page according to a print order of pages (a step S1705).

In the case of being determined in the step S1705 that there is the next page, the CPU 212 obtains a sheet size of the next page from the intermediate data obtained from the OS 313 (a step S1706). Next, the CPU 212 determines whether or not the sheet size obtained in the step S1706 is the same as the sheet size held in the memory 213 (a step S1707). The sheet size held in the memory 213 is the sheet size held in the step S1703 or the sheet size updated in a step S1710, which will be described below.

In the case of being determined in the step S1707 that the sheet size obtained in the step S1706 is the same as the sheet size held in the memory 213, the print data generating processing shown in FIG. 17 proceeds to a step S1708. In the step S1708, the CPU 212 updates the print data held in the storage unit 214 so that the page whose sheet size has been obtained in the step S1706 becomes the next page following a previous page in a document including the previous page of the page whose sheet size has been obtained in the step S1706. After that, the print data generating processing shown in FIG. 17 returns to the step S1705.

In the case of being determined in the step S1707 that the sheet size obtained in the step S1706 is not the same as the sheet size held in the memory 213, the print data generating processing shown in FIG. 17 proceeds to a step S1709. In the step S1709, the CPU 212 updates the print data held in the storage unit 214 so that the page whose sheet size has been obtained in the step S1706 becomes a first page of a new document different from the document including the previous page of the page whose sheet size has been obtained in the step S1706. At this time, the CPU 212 sets the sheet size obtained in the step S1706 as a sheet size for the new document. Next, the CPU 212 updates the sheet size held in the memory 213 to the sheet size obtained in the step S1706 (the step S1710). After that, the print data generating processing shown in FIG. 17 returns to the step S1705.

In the case of being determined in the step S1705 that there is no next page, the print data generating processing shown in FIG. 17 is ended. In this way, in the second embodiment, in the case that the printer which becomes the transmission destination of the print data has the capability of the mixed-sheet printing, the print data, in which different sheet sizes are set as the print setting for each document (the respective documents), is generated.

In the case of being determined in the step S1702 that the printer which becomes the transmission destination of the print data does not have the capability of the mixed-sheet printing, the CPU 212 obtains the sheet size of the head page from the intermediate data obtained from the OS 313. The CPU 212 holds the obtained sheet size in the memory 213 (a step S1711).

Next, the CPU 212 generates print data in which the head page in the intermediate data obtained from the OS 313 becomes a first page (a step S1712). In the step S1712, the CPU 212 sets the sheet size obtained in the step S1711 as a sheet size of the print setting of the print data. The CPU 212 holds the generated print data in the storage unit 214. Next, the CPU 212 refers to the intermediate data obtained from the OS 313, and determines whether or not there is a next page according to the print order of pages (a step S1713).

In the case of being determined in the step S1713 that there is the next page, the CPU 212 obtains a sheet size of the next page from the intermediate data (a step S1714). Next, the CPU 212 determines whether or not the sheet size obtained in the step S1714 is the same as the sheet size held in the memory 213 (a step S1715). The sheet size held in the memory 213 is the sheet size held in the step S1711 or the sheet size updated in a step S1718, which will be described below.

In the case of being determined in the step S1715 that the sheet size obtained in the step S1714 is the same as the sheet size held in the memory 213, the print data generating processing shown in FIG. 17 proceeds to a step S1716. In the step S1716, the CPU 212 updates the print data including data of a previous page of the page whose sheet size has been obtained in the step S1714 so that the page whose sheet size has been obtained in the step S1714 becomes the next page following the previous page. After that, the print data generating processing shown in FIG. 17 returns to the step S1713.

In the case of being determined in the step S1715 that the sheet size obtained in the step S1714 is not the same as the sheet size held in the memory 213, the print data generating processing shown in FIG. 17 proceeds to a step S1717. In the step S1717, the CPU 212 generates new print data in which the page whose sheet size has been obtained in the step S1714 becomes a first page. At this time, the CPU 212 sets the sheet size obtained in the step S1714 as a sheet size of the new print data. Next, the CPU 212 updates the sheet size held in the memory 213 to the sheet size obtained in the step S1714 (a step S1718). After that, the print data generating processing shown in FIG. 17 returns to the step S1713.

In the case of being determined in the step S1713 that there is no next page, the print data generating processing shown in FIG. 17 is ended.

In the step S1701, in the case that the information indicating the mixed-sheet printing is not included in the above print setting information, the CPU 212 performs the process of a step S1719 that is the same as the process of the step S1511 described above. After that, the print data generating processing shown in FIG. 17 is ended.

In the second embodiment described above, in the case that the printer which becomes the transmission destination of the print data has the capability of the mixed-sheet printing, one piece of print data, in which the sheet size is set for each document, is generated. As a result, the printer does not need to interpret the sheet size of each page based on the received print data, and the processing load on the printer can be further reduced than in the configuration of the first embodiment described above.

It should be noted that although in the second embodiment described above, the sheet size is held in the memory 213 in the step S1703 and in the step S1711, the sheet size may be held in the storage unit 214.

Moreover, although in the second embodiment described above, the print data generated in the step S1704, the print data generated in the step S1712, and the print data generated in other steps of FIG. 17 are held in the storage unit 214, these print data may be held in the memory 213.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., ASIC) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-010273, filed on Jan. 26, 2023, which is hereby incorporated by reference herein in its entirety.

What is claimed is:

1. A non-transitory computer-readable storage medium storing an application program for causing a computer to execute a control method for an information processing apparatus that causes a printing apparatus to execute printing, the application program cooperating with a general printer driver, the control method comprising:

obtaining intermediate data including a predetermined print setting, the intermediate data being data of a plurality of pages, and the predetermined setting being different among the pages;

determining whether or not the printing apparatus has a capability of mixed-sheet printing, the general printer driver not being capable of the mixed-sheet printing;

generating print data for causing the printing apparatus to execute the mixed-sheet printing based on the intermediate data; and transmitting the generated print data to the printing apparatus, wherein generating the print data includes, in a case that the printing apparatus does not have the capability of the mixed-sheet printing, obtaining the predetermined print settings included in the intermediate data in order of the pages to be printed, sequentially comparing the predetermined print setting of each page with the predetermined print setting of an immediately preceding page to detect a change in the predetermined print setting, and generating a plurality of pieces of print data based on a plurality of pieces of divided intermediate data obtained by dividing the intermediate data at each detected change based on differences among the predetermined print settings of the plurality of pages.

2. The non-transitory computer-readable storage medium according to claim 1, wherein generating the print data includes, in a case that the printing apparatus has the capability of the mixed-sheet printing, generating one piece of print data in which the predetermined print setting is set for each page.

3. The non-transitory computer-readable storage medium according to claim 1, wherein generating the print data includes, in a case that the printing apparatus has the capability of the mixed-sheet printing, generating one piece of print data in which the predetermined print setting is set for each document.

4. The non-transitory computer-readable storage medium according to claim 1, wherein the control method further comprises:

causing a display of the information processing apparatus to display a setting screen that accepts an instruction to generate the print data, and in a case that the printing apparatus has the capability of the mixed-sheet printing, causing the display to display the setting screen including a setting item of the mixed-sheet printing.

5. The non-transitory computer-readable storage medium according to claim 1, wherein the control method further comprises:

causing a display of the information processing apparatus to display a setting screen that accepts an instruction to generate the print data, and in a case that the printing apparatus does not have the capability of the mixed-sheet printing and a predetermined setting for causing to display a setting item of the mixed-sheet printing has been made, causing the display to display the setting screen including the setting item of the mixed-sheet printing.

6. The non-transitory computer-readable storage medium according to claim 1, wherein the predetermined print setting is a sheet size setting.

7. The non-transitory computer-readable storage medium according to claim 1, wherein the predetermined print setting is a sheet orientation setting.

8. The non-transitory computer-readable storage medium according to claim 1, wherein the predetermined print setting is a page aggregation setting.

9. The non-transitory computer-readable storage medium according to claim 1, wherein the predetermined print setting is a setting indicating one of one-sided printing and double-sided printing.

10. The non-transitory computer-readable storage medium according to claim 1, wherein the divided intermediate data includes data corresponding to each page.

11. A control method for an information processing apparatus that causes a printing apparatus to execute printing using an application program cooperating with a general printer driver, the control method comprising:

a step of obtaining intermediate data including a predetermined print setting, the intermediate data being data of a plurality of pages, and the predetermined setting being different among the pages;

a step of determining whether or not the printing apparatus has a capability of mixed-sheet printing, the general printer driver not being capable of the mixed-sheet printing;

a generating step of generating print data for causing the printing apparatus to execute the mixed-sheet printing based on the intermediate data; and a step of transmitting the generated print data to the printing apparatus, wherein, in a case that the printing apparatus does not have the capability of the mixed-sheet printing, the generating step obtains the predetermined print settings included in the intermediate data in order of the pages to be printed, sequentially compares the predetermined print setting of each page with the predetermined print setting of an immediately preceding page to detect a change in the predetermined print setting, and generates a plurality of pieces of print data based on a plurality of pieces of divided intermediate data obtained by dividing the intermediate data at each detected change based on differences among the predetermined print settings of the plurality of pages.

12. An information processing apparatus that causes a printing apparatus to execute printing using an application program cooperating with a general printer driver, the information processing apparatus comprising:

a controller configured or programmed to function as:

an obtaining unit that obtains intermediate data including a predetermined print setting, the intermediate data being data of a plurality of pages, and the predetermined setting being different among the pages;

a determining unit that determines whether or not the printing apparatus has a capability of mixed-sheet printing, the general printer driver not being capable of the mixed-sheet printing;

a generating unit that generates print data for causing the printing apparatus to execute the mixed-sheet printing based on the intermediate data; and a transmitting unit that transmits the generated print data to the printing apparatus, wherein, in a case that the printing apparatus does not have the capability of the mixed-sheet printing, the generating unit obtains the predetermined print settings included in the intermediate data in order of the pages to be printed, sequentially compares the predetermined print setting of each page with the predetermined print setting of an immediately preceding page to detect a change in the predetermined print setting, and generates a plurality of pieces of print data based on a plurality of pieces of divided intermediate data obtained by dividing the intermediate data at each detected change based on differences among the predetermined print settings of the plurality of pages.

* * * * *